US012423646B2

(12) United States Patent
Zhang et al.

(10) Patent No.: US 12,423,646 B2
(45) Date of Patent: Sep. 23, 2025

(54) STORAGE COMPARTMENT COORDINATION AND TRACKING

(71) Applicant: BoxNearby Corp., Santa Clara, CA (US)

(72) Inventors: Zhenghui Zhang, Palo Alto, CA (US); Licheng Richard Zai, Los Gatos, CA (US); Hailei Yang, NanJing (CN); Viet Nguyen, San Jose, CA (US)

(73) Assignee: BoxNearby Corp., Santa Clara, CA (US)

( * ) Notice: Subject to any disclaimer, the term of this patent is extended or adjusted under 35 U.S.C. 154(b) by 0 days.

(21) Appl. No.: 18/358,607

(22) Filed: Jul. 25, 2023

(65) Prior Publication Data

US 2023/0376887 A1 Nov. 23, 2023

Related U.S. Application Data

(63) Continuation-in-part of application No. 17/076,438, filed on Oct. 21, 2020, now Pat. No. 11,710,083.
(Continued)

(51) Int. Cl.
*G06Q 10/0836* (2023.01)
*G06K 7/14* (2006.01)
(Continued)

(52) U.S. Cl.
CPC ......... *G06Q 10/0836* (2013.01); *G06Q 10/02* (2013.01); *G07C 9/00896* (2013.01);
(Continued)

(58) Field of Classification Search
CPC ............... G06Q 10/0836; G06Q 10/02; G07C 9/00896; G07C 2009/0092; G06K 7/1417; G06K 19/06037
See application file for complete search history.

(56) References Cited

U.S. PATENT DOCUMENTS 6,480,758 B2 * 11/2002 Stevens ............... G07C 9/28
700/244
9,482,522 B2 * 11/2016 Motoyama ......... G07C 9/00896
(Continued)

FOREIGN PATENT DOCUMENTS

CN 203217638 U 9/2013
CN 104471610 A * 3/2015 ........... G06Q 10/083
(Continued)

OTHER PUBLICATIONS

Ze-hong, "Multi-functional parcel Delivery Locker System", published by 2015 ICCCS in 2015, all pages (Year: 2015).*
(Continued)

*Primary Examiner* — Omar Zeroual
(74) *Attorney, Agent, or Firm* — Sheppard Mullin Richter & Hampton LLP

(57) ABSTRACT

A system includes storage compartments, each of the storage compartments being configured to store shipments and having a locking mechanism and a computing system that controls operations of the storage compartments. The computing system performs: receiving a request from a providing entity to reserve a portion of the storage compartments, obtaining identification information of a requesting entity requesting a shipment from the providing entity, generating a scannable code; transmitting the scannable code and the identification code of the requesting entity to the providing entity, determining a compartment of the storage compartments to be reserved to temporarily store the shipment, detecting a scan of the scannable code or an input of the identification code on a computing device at a terminal of a location of or adjacent to the reserved determined compartment, and in response to detecting the scan or the input of the identification code, opening the reserved determined compartment.

1 Claim, 33 Drawing Sheets

Related U.S. Application Data

(60) Provisional application No. 62/924,552, filed on Oct. 22, 2019.

(51) Int. Cl.
   G06K 19/06 (2006.01)
   G06Q 10/02 (2012.01)
   G07C 9/00 (2020.01)

(52) U.S. Cl.
   CPC ..... *G06K 7/1417* (2013.01); *G06K 19/06037* (2013.01); *G07C 2009/0092* (2013.01)

(56) References Cited

U.S. PATENT DOCUMENTS

| | | | |
|---|---|---|---|
| 9,547,962 B2* | 1/2017 | Motoyama | G07F 17/13 |
| 9,798,999 B2* | 10/2017 | Schenken | G06Q 10/0835 |
| 9,934,483 B1* | 4/2018 | Sangani | G06Q 10/0837 |
| 10,043,151 B1* | 8/2018 | Zhu | G06K 19/06037 |
| 10,210,474 B2* | 2/2019 | Robinson | G06Q 10/0838 |
| 10,424,143 B2* | 9/2019 | Miller | G07C 9/00912 |
| 10,512,351 B1* | 12/2019 | Valeriano | E05B 47/0001 |
| 10,657,591 B1* | 5/2020 | Chen | G06Q 20/18 |
| 11,526,838 B1* | 12/2022 | Sethuraman | G06Q 10/0836 |
| 2002/0035515 A1* | 3/2002 | Moreno | B65G 1/0485 340/5.73 |
| 2002/0072945 A1* | 6/2002 | Yang | G06Q 10/08 705/7.26 |
| 2002/0080030 A1* | 6/2002 | Inomata | G07F 17/0014 340/542 |
| 2002/0152174 A1* | 10/2002 | Woods | G06Q 30/04 705/61 |
| 2002/0184514 A1* | 12/2002 | Granzer | G07F 17/12 713/193 |
| 2005/0040931 A1* | 2/2005 | Shitan | G07C 9/00309 340/5.5 |
| 2005/0083176 A1 | 4/2005 | Yamada | |
| 2005/0179517 A1* | 8/2005 | Harms | G07F 5/26 70/277 |
| 2008/0052044 A1 | 2/2008 | Shoenfeld | |
| 2011/0040651 A1 | 2/2011 | Swamy et al. | |
| 2011/0270714 A1* | 11/2011 | Myrick | G06Q 10/08 705/333 |
| 2012/0209913 A1 | 8/2012 | Ananthanarayanan et al. | |
| 2013/0166060 A1* | 6/2013 | Irwin | G07F 7/08 700/214 |
| 2013/0261792 A1* | 10/2013 | Gupta | G05B 15/02 700/232 |
| 2014/0330603 A1* | 11/2014 | Corder | G07F 17/13 705/7.12 |
| 2015/0039529 A1* | 2/2015 | Barakat | G01K 7/42 705/332 |
| 2015/0081585 A1 | 3/2015 | Kadaba | |
| 2015/0088698 A1 | 3/2015 | Ackerman | |
| 2015/0106294 A1* | 4/2015 | Robinson | G06F 21/62 705/339 |
| 2015/0106296 A1 | 4/2015 | Robinson et al. | |
| 2015/0112887 A1* | 4/2015 | Camp | G06Q 10/0836 705/339 |
| 2015/0120601 A1* | 4/2015 | Fee | G06Q 10/0836 705/339 |
| 2015/0178676 A1* | 6/2015 | Carr | G06Q 10/0836 705/332 |
| 2015/0186840 A1* | 7/2015 | Torres | A47B 81/00 705/339 |
| 2015/0193731 A1* | 7/2015 | Stevens | G06Q 10/083 705/26.7 |
| 2015/0356801 A1* | 12/2015 | Nitu | G07C 9/00904 340/5.61 |
| 2016/0098678 A1* | 4/2016 | Levy | G06Q 10/0836 705/339 |
| 2016/0133074 A1* | 5/2016 | Amdahl | G07C 9/00571 340/5.54 |
| 2016/0180259 A1* | 6/2016 | Marianko | H04L 65/1069 705/5 |
| 2016/0223388 A1* | 8/2016 | Pointeau | G01G 19/42 |
| 2016/0300187 A1* | 10/2016 | Kashi | G06Q 10/0832 |
| 2018/0033235 A1* | 2/2018 | Dotterweich | G07F 17/12 |
| 2018/0060800 A1* | 3/2018 | Robinson | G07C 9/00571 |
| 2018/0174099 A1* | 6/2018 | Winkle | G07C 9/00896 |
| 2018/0349842 A1* | 12/2018 | Han | G06F 21/31 |
| 2018/0365640 A1* | 12/2018 | Simms | G06K 19/06018 |
| 2018/0365641 A1* | 12/2018 | Zhu | G06K 7/1417 |
| 2019/0108481 A1* | 4/2019 | Kashi | G06Q 10/0836 |
| 2019/0135598 A1* | 5/2019 | Agarwal | G05D 1/0274 |
| 2019/0311325 A1* | 10/2019 | Reblin | G06Q 10/0836 |
| 2019/0350398 A1* | 11/2019 | Raphael | A47G 29/141 |
| 2020/0250614 A1* | 8/2020 | Zhu | G06Q 10/0836 |
| 2020/0302388 A1* | 9/2020 | Merle | G06Q 10/0833 |
| 2020/0401995 A1* | 12/2020 | Aggarwala | G06Q 10/087 |
| 2021/0022536 A1* | 1/2021 | Anderson | G06Q 10/0832 |
| 2021/0114557 A1* | 4/2021 | Arakawa | G06F 21/35 |
| 2021/0117875 A1* | 4/2021 | Zhang | G06Q 10/0833 |
| 2021/0220498 A1* | 7/2021 | Kashi | A61L 2/10 |
| 2022/0012683 A1* | 1/2022 | Taylor | G07C 9/00896 |
| 2022/0028192 A1* | 1/2022 | O'Rourke | G07C 9/00182 |
| 2022/0058534 A1* | 2/2022 | Ishida | G06Q 30/0637 |
| 2022/0339308 A1* | 10/2022 | Soderberg | A61L 2/28 |
| 2023/0012772 A1* | 1/2023 | Kalathil | A47G 29/30 |
| 2023/0018047 A1* | 1/2023 | Skaaksrud | G05D 1/245 |

FOREIGN PATENT DOCUMENTS

| | | | | |
|---|---|---|---|---|
| EP | 1456794 A1 * | 9/2004 | | G06Q 10/08 |
| JP | 2011034238 A * | 2/2011 | | |
| JP | 2019037389 A * | 3/2019 | | |
| JP | 2020077391 A * | 5/2020 | | G06Q 10/04 |
| JP | 2020107222 A * | 7/2020 | | |
| JP | 7164431 B2 * | 11/2022 | | |
| WO | WO200152199 A2 | 7/2001 | | |
| WO | WO-0161537 A2 * | 8/2001 | | G06Q 10/0637 |
| WO | WO200161537 A2 | 8/2001 | | |
| WO | WO-0182253 A1 * | 11/2001 | | A47G 29/141 |
| WO | WO200182253 A1 | 11/2001 | | |
| WO | WO-03046782 A2 * | 6/2003 | | G06Q 10/08 |
| WO | WO2003046782 A2 | 6/2003 | | |
| WO | WO-03056490 A1 * | 7/2003 | | G06Q 10/08 |
| WO | WO2003056490 A1 | 7/2003 | | |
| WO | WO-2013170316 A1 * | 11/2013 | | G06Q 10/083 |
| WO | WO-2015114331 A1 * | 8/2015 | | A23B 4/06 |
| WO | WO-2019083933 A1 * | 5/2019 | | E05B 65/0075 |

OTHER PUBLICATIONS

International Search Report and Written Opinion for PCT/US2020/056696 dated Feb. 9, 2021, 18 pages.

Iwan et al., "Analysis of Parcel Lockers' Efficiency as the Last Mile Delivery Solution—The Results of the Research in Poland," Transportation Research Procedia, 2016, vol. 12, pp. 644-655.

Ze-Hong et al., "Multi-functional Parcel Delivery Locker System," International Conference on Computer and Computational Sciences, 2015, pp. 207-210.

\* cited by examiner

FIG. 13

STORAGE COMPARTMENT COORDINATION AND TRACKING

CROSS REFERENCE TO RELATED APPLICATIONS

This application is a continuation-in-part of U.S. application Ser. No. 17/076,438, filed Oct. 21, 2020, which claims the benefit under 35 U.S.C. 119(e) of U.S. provisional patent application No. 62/924,552, filed Oct. 22, 2019.

BACKGROUND

During a shipment, a product is typically packaged in a shipping package such as corrugated box and shipped, by a carrier, to a particular address of a residence or place of business. However, if no one is present at that address, the product may be left temporarily unattended. Additionally, the package may need to be stored in special conditions, such as temperature and humidity conditions. An alternative is for the product to be delivered to another storage location such as a storage compartment. However, currently, operations of tracking the product are not well established between different participants.

SUMMARY

The present disclosure provides systems and methods that improve the tracking and coordination of goods and storage compartments to increase an efficiency and transparency of delivery of the goods.

Described herein, in an implementation, is a system comprising storage compartments, each of the storage compartments being configured to store shipments and having a locking mechanism, and a computing system configured to control operations of the storage compartments. The computing system comprises one or more computing devices, one or more processors, and a memory storing instructions that, when executed by the one or more processors, causes the computing system to perform operations. The operations comprise: receiving a request from a providing entity to reserve a portion of the storage compartments; obtaining identification information of a requesting entity requesting a shipment from the providing entity; setting an identification code of the requesting entity; obtaining an input by the requesting entity of a pickup location or automatically selecting a pickup location based on a location of the requesting entity, the pickup location corresponding to a location of the storage compartments; obtaining, from the providing entity, an input of a portion of the identification information of the requesting entity; generating a scannable code specific to the providing entity; transmitting the scannable code and the identification code of the requesting entity to the providing entity; determining a compartment of the storage compartments to be reserved in order to temporarily store the shipment based on a size of the compartment and a size of the shipment; reserving the determined compartment to temporarily store the shipment; detecting a scan of the scannable code or an input of the identification code on a computing device at a terminal of a location of or adjacent to the reserved determined compartment; and in response to detecting the scan or the input of the identification code, opening the reserved determined compartment.

In some embodiments, the instructions further cause the computing system to perform: detecting that the shipment has been placed inside the reserved determined compartment; in response to detecting that the shipment is placed inside the reserved determined compartment, generating a second scannable code or a pickup code comprising an alphanumeric code, the second scannable code and the pickup code being used to open the reserved determined compartment upon scanning of the second scannable code or entry of the pickup code at the computing device; providing, to the requesting entity, the second scannable code or the pickup code; and linking the identification number to the second scannable code or the pickup code.

In some embodiments, the instructions further cause the computing system to perform: generating a label that includes the identification code, a tracking number, the pickup location and an estimated pickup time; and transmitting, through a cloud service, a web service, or the computing device at the terminal, the label to the providing entity.

In some embodiments, the instructions further cause the computing system to perform: in response to opening the reserved determined compartment, determining whether the reserved determined compartment is of an adequate size to store the shipment; and in response to the reserved determined compartment being determined not to be of an adequate size, reserving a larger compartment that is available and having a size adequate to store the shipment.

In some embodiments, the instructions further cause the computing system to perform: in response to reserving the larger compartment, cancelling the reservation of the reserved determined compartment.

In some embodiments, the instructions further cause the computing system to perform: determining an estimated arrival time of the shipment from the providing entity based on historical data of the providing entity or a selection of the estimated arrival time by the providing entity; reserving the reserved determined compartment at least between the estimated arrival time and an estimated pickup time of the requesting entity; detecting whether the reserved determined compartment remains empty for more than a threshold amount of time following the estimated arrival time; and in response to detecting that the reserved determined compartment remains empty for more than the threshold amount of time following the estimated arrival time, cancelling the reservation of the reserved determined compartment.

In some embodiments, the instructions further cause the computing system to perform: determining whether the shipment has been retrieved by the requesting entity at an estimated pickup time of the requesting entity; and in response to determining that the shipment has not been retrieved by the requesting entity at the estimated pickup time, making the reserved determined compartment available for sharing to store one or more other shipments.

In some embodiments, the determining a compartment of the storage compartments comprises: determining whether a compartment of the storage compartments having dimensions greater than respective dimensions of the shipment is available between an estimated arrival time of the shipment and an estimated pickup time of the requesting entity; in response to determining that the compartment having dimensions greater than respective dimensions of the shipment is unavailable between the estimated arrival time and the estimated pickup time, determining whether one or more sharable compartments are available between the estimated arrival time and the estimated pickup time; and in response to determining that one or more sharable compartments are available, determining a sharable compartment having a largest remaining space between the estimated arrival time and the estimated pickup time to be reserved.

In some embodiments, the sharable compartment comprises an other compartment currently occupied by an other shipment and in which an other entity reserving the other compartment and the requesting entity have both authorized sharing.

In some embodiments, the instructions further cause the computing system to perform: determining a weight of each shipment in the sharable compartment; linking the weight of each shipment to an identification code, a second scannable code, or a pickup code provided to the requesting entity or to the other entity; detecting a scan of a second scannable code or an entry of a pickup code or identification code at the computing device at the terminal; in response to detecting the scan or the entry, determining whether the requesting entity has retrieved a correct shipment based on whether a change in weight after retrieval matches the weight linked to the identification code, the second scannable code, or the pickup code.

In some embodiments, the instructions further cause the computing system to perform: determining whether the shipment has been retrieved by the requesting entity at an estimated pickup time; determining whether the reserved determined compartment is reserved after the estimated pickup time; in response to determining that the shipment has not been retrieved by the requesting entity at the estimated pickup time, and in response to determining that the reserved determined compartment is not reserved after the estimated pickup time, prompting the requesting entity to input an updated estimated pickup time; and in response to the requesting entity inputting the updated estimated pickup time, updating the estimated pickup time to the updated estimated pickup time.

In some embodiments, the instructions further cause the computing system to perform: in response to determining that the reserved determined compartment has been reserved by an other entity at the updated estimated pickup time, requesting an authorization by the other entity to share the reserved determined compartment until the updated estimated pickup time.

In some embodiments, the instructions further cause the computing system to perform: in response to detecting that the shipment is placed inside the reserved determined compartment, determining whether the shipment fits inside a smaller compartment at a same or adjacent location as the reserved determined compartment; and in response to determining that the shipment fits inside a smaller compartment, reserving the smaller compartment; and cancelling the reservation of the reserved determined compartment.

In some embodiments, the setting an identification code of the requesting entity comprises: initially setting the identification code to at least a portion of a phone number of the requesting entity; prompting the requesting entity to enter a new identification code; determining whether the new identification code has been used by an other entity; and in response to determining that the new identification number has been used by an other entity, prompting the requesting entity to reenter a different identification code, wherein the new identification code comprises characters including any of letters, numbers, or a combination of letters and numbers and symbols determining whether the shipment has been retrieved by the requesting entity at an estimated pickup time of the requesting entity; and in response to determining that the shipment has not been retrieved by the requesting entity at the estimated pickup time, making the reserved determined compartment available for sharing to store one or more other shipments.

In some embodiments, the instructions further cause the computing system to perform: continuously detecting a temperature and a humidity inside each compartment of the storage compartments; determining whether the respective temperature and the respective humidity inside each of the compartments are within respective allowable ranges; and in response to a temperature or a humidity inside one of the compartments not being within an allowable range, adjusting the temperature or the humidity inside one of the compartments to be within the respective allowable range; and wherein the determining a compartment of the storage compartments to be reserved is further based on a temperature and a humidity of the compartment.

In some embodiments, the instructions further cause the computing system to perform: receiving a request from the requesting entity to return the shipment back to the providing entity; in response to receiving the request from the requesting entity, generating a third scannable code for the requesting entity; transmitting the third scannable code to the requesting entity; determining a second compartment of the storage compartments to be reserved in order to temporarily store the shipment; reserving the second compartment for the requesting entity; detecting a scan of the scannable code or an input of the identification code combined with a security PIN on a computing device at a terminal of a location of the second compartment; in response to detecting the scan or the input of the identification code combined with a security PIN, opening the reserved determined second compartment; detecting that the shipment has been placed into the reserved determined second compartment; and transmitting a communication to the providing entity that the shipment has been placed into the reserved determined second compartment.

In some embodiments, at least one of the storage compartments comprises a smart crate that monitors sensor data, the sensor data comprising a temperature, humidity, or sterilization; and the instructions further cause the computing system to perform: downloading, from the smart crate, the monitored sensor data; recording, in one or more logs, the monitored sensor data; and sharing the one or more logs with the providing entity and the requesting entity.

In some embodiments, the instructions further cause the computing system to perform: generating a label that includes the identification code, a tracking number, the pickup location and an estimated pickup time; transmitting the generated label and the scannable code to a merchant's courier; receiving an input from the merchant's courier of an estimated arrival time to the reserved determined compartment; and wherein: the reserving the determined compartment comprises reserving the determined compartment during a time period starting from the estimated arrival time.

In some embodiments, the detecting that the shipment has been placed inside the reserved determined compartment is based on a weight change detected by a weight sensor inside the reserved determined compartment and an image or video captured by an image sensor inside the reserved determined compartment.

In some embodiments, the system further comprises a cleaning system that disinfects germs or bacteria, the cleaning system being configured to clean each compartment of the storage compartments based on a frequency of use of each compartment. For example, a frequency or intensity of cleaning may be based on a frequency of use (e.g., how often each compartment is or has been reserved). The frequency or intensity of cleaning may be controlled by the one or more processors.

Described herein, in another implementation, is a system comprising storage compartments, each of the storage compartments being configured to store shipments and having a locking mechanism; a computing system configured to control operations of the storage compartments. The computing system comprises one or more processors; and a memory storing instructions that, when executed by the one or more processors, causes the computing system to perform accepting identification information including a name and an address from a user ordering a shipment; setting an identification number of the user; accepting an input by the user of a pickup location or automatically selecting a pickup location based on the address of the user; accepting an input, from a merchant, of any of the name and contact information of the user; retrieving the identification number of the user based on the input from the merchant; sending the identification number of the user and a tracking number to the merchant; generating an address label that includes the identification number, the tracking number, the pickup location and an estimated pickup time, based on the input by the user; sending the generated address label to the merchant or a merchant's courier; determining whether the merchant's courier has a first scannable code; in response to determining that the merchant's courier does not have the first scannable code, generating a first scannable code and providing the first scannable code to the merchant's courier, the first scannable code being linked with the identification number; providing an interface for the merchant's courier to select a size of the storage compartment and an estimated arrival time, or automatically selecting the estimated arrival time based on historical data of the merchant's courier, wherein the merchant's courier delivers the shipment for the merchant to the pickup location; determining whether a storage compartment of the selected size is available at the selected pickup location between the estimated arrival time and the estimated pickup time; in response to determining that the storage compartment of the selected size is available, reserving the storage compartment between the estimated arrival time of the merchant's courier and the estimated pickup time by the user, or reserving the storage compartment for a predetermined length of time starting from the estimated arrival time of the merchant's courier; in response to the merchant's courier scanning the first scannable code or inputting the identification number at the pickup location, opening the reserved storage compartment; and detecting that the shipment is placed inside the reserved storage compartment.

In some embodiments, the instructions further cause the system to perform: in response to detecting that the shipment is placed inside the reserved storage compartment, providing the user a second scannable code or pickup code that opens the storage compartment upon scanning to allow the user to retrieve the shipment; and linking the identification number to the second scannable coder the pickup code.

In some embodiments, the instructions further cause the system to perform: in response to determining that the storage compartment of the selected size is unavailable, determining a nearest pickup location to the selected pickup location at which a storage compartment of the selected size is available; updating the selected pickup location to the nearest pickup location; and informing the user of the updated selected pickup location.

In some embodiments, the instructions further cause the system to perform: in response to opening the selected storage compartment, in response to the selected storage compartment being determined not to be a proper size for the shipment, reserving a larger storage compartment that is available and having a size adequate to hold the shipment.

In some embodiments, the instructions further cause the system to perform: in response to reserving the larger storage compartment, cancelling the reservation of the storage compartment.

In some embodiments, the instructions further cause the system to perform: in response to the merchant's courier unsuccessfully scanning the first scannable code at the pickup location: determining that the system does not recognize the first scannable code; prompting the merchant's courier to enter an identifier; and in response to verifying the identifier, opening the reserved selected compartment.

In some embodiments, the instructions further cause the system to perform: in response to detecting that the reserved selected compartment remains empty for an amount of time after the estimated arrival time, cancelling the reservation of the storage compartment.

In some embodiments, the instructions further cause the system to perform: in response to determining that the shipment has not been retrieved by the user at the estimated pickup time, making the reserved selected compartment available for sharing by other users to store other shipments.

In some embodiments, the detecting that the shipment is placed inside the reserved storage compartment is based on a change in weight inside the reserved storage compartment.

In some embodiments, the instructions further cause the system to perform: in response to determining that the storage compartment of the selected size is unavailable, determining whether a sharable storage compartment is available between the estimated arrival time of the merchant's courier and the estimated pickup time by the user; in response to determining that a sharable storage compartment is available, reserving a sharable storage compartment having a largest remaining space between the estimated arrival time of the merchant's courier and the estimated pickup time by the user.

In some embodiments, the sharable storage compartment comprises another storage compartment in which another user of the another storage compartment authorizes sharing by other users, and the user of the another storage compartment authorizes sharing by other users.

In some embodiments, the instructions further cause the system to perform: determining a weight of each shipment in the sharable storage compartment; linking the weight of each shipment to a respective identification number, a second scannable code, or a pickup code provided to each user; in response to the user scanning the second scannable code, inputting the identification number or the pickup code to pick up the shipment, determining whether the user has picked up a correct shipment based on whether a weight of the shipment is linked to the second scannable code, the identification number, or the pickup code.

In some embodiments, the instructions further cause the system to perform: in response to determining that the user has not picked up a correct shipment, issuing an alarm.

In some embodiments, the instructions further cause the system to perform: in response to determining that the shipment has not been retrieved by the user at the estimated pickup time, and in response to determining that the storage compartment is not reserved at the estimated pickup time, prompting the user to input an updated estimated pickup time; in response to the user inputting the updated pickup time to the updated estimated pickup time.

In some embodiments, the instructions further cause the system to perform: in response to determining that the storage compartment is reserved by another user at the updated estimated pickup time, requesting an authorization by the another user to share the storage compartment until the updated estimated pickup time.

In some embodiments, the instructions further cause the system to perform: in response to detecting that the shipment is placed inside the reserved storage compartment, determining whether the shipment can be placed inside a smaller storage compartment; and in response to determining that the shipment can be placed inside a smaller storage compartment, reserving the smaller storage compartment; and requesting the merchant's courier to place the shipment inside the smaller storage compartment.

In some embodiments, the setting an identification number of the user comprises: initially setting the identification number to a portion of the phone number or the whole phone number of the user; prompting the user to enter a new identification number; determining whether the new identification number has been used by another user; and in response to determining that the new identification number has been used by another user, prompting the user to reenter a different identification number. Therefore, the identification number may be dynamic, modified, or modifiable following the initial setting of the identification number. In particular, making the identification number modifiable may enhance security in case a previous identification number is inadvertently leaked.

In some embodiments, the new identification number comprises characters including any of letters, numbers, or a combination of letters and numbers and symbols.

In some embodiments, the instructions further cause the system to perform: continuously detecting a temperature and a humidity inside each of the storage compartments; determining whether the respective temperature and the respective humidity inside each of the storage compartments are within respective allowable ranges; and in response to a temperature or a humidity inside one of the storage compartments not being within a respective allowable range, adjusting the temperature or the humidity inside one of the storage compartments to be within the respective allowable range.

Described herein, in another implementation, is a system comprising storage compartments, each of the storage compartments being configured to store shipments and having a locking mechanism; a computing system configured to control operations of the storage compartments. The computing system comprises: one or more processors; and a memory storing instructions that, when executed by the one or more processors, causes the computing system to perform: accepting identification information including a name and an address from a user dropping off a shipment; setting an identification number of the user; providing a first scannable code to the user, the first scannable code being linked with the identification number; accepting an input by the user of a dropoff location, a selection of a carrier, and an estimated dropoff time of the shipment, or automatically selecting a dropoff location based on the address of the user; selecting, based on the estimated dropoff time, the carrier selection, and the dropoff location, an estimated pickup time by the selected carrier; prompting the user to select a size of the storage compartment; determining whether a storage compartment of the selected size is available at the selected dropoff location between the estimated dropoff time and the estimated pickup time; in response to determining that the storage compartment of the selected size is available, reserving the storage compartment between the estimated dropoff time and the estimated pickup time; in response to the user scanning the first scannable code or inputting the identification number and a pin at the pickup location, opening the reserved storage compartment; detecting that the shipment is placed inside the reserved storage compartment; in response to detecting that the shipment is placed inside the reserved storage compartment, providing the selected carrier or another authorized party a second scannable coder a pickup code that opens the storage compartment upon scanning to allow the carrier to retrieve the shipment, the second scannable code or the pickup code being linked with the identification number.

In some embodiments, the instructions further cause the system to perform: in response to determining that the merchant's courier already has a first scannable code, providing an interface for the merchant's courier to approve the shipment by scanning the first scannable code.

In some embodiments, the instructions further cause the system to perform: providing an interface to allow the merchant or the merchant's courier to cancel the reservation of the storage compartment.

In some embodiments, the instructions further cause the system to perform: recording the temperature, humidity, sterilization, or other types of monitoring data from one or more lockers in one or more logs or downloading temperature humidity, sterilization, or other types of monitoring data from a smart crate with a device that stores the temperature and the humidity; and sharing the one or more logs having information of the temperature and the humidity with the merchant, the merchant's courier, or the user.

In some embodiments, the instructions further cause the system to perform: in response to detecting that the shipment is placed inside the reserved storage compartment, providing the selected carrier or another authorized party a second scannable code, a pickup code, or a button on a user interface of the selected carrier that opens all storage compartments in which shipments for the selected carrier are placed.

In some embodiments, the instructions further cause the system to perform: in response to determining that multiple shipments are scheduled to be sent to the storage compartments at a same time, sending each of the multiple shipments to the storage compartments.

In some embodiments, the system further comprises a cleaning system that kills germs or bacteria.

In some embodiments, the instructions further cause the system to perform: checking in or checking out the smart crate, wherein the smart crate comprises a RF chip or a barcode.

In some embodiments, the instructions further cause the system to perform: receiving a tracking number sent by the merchant; determining an estimated time of arrival of the merchant's courier based on the tracking number; receiving a confirmation of the tracking number and the estimated time of arrival from the merchant's courier; preparing the storage compartment and reserving the storage compartment at the estimated time of arrival.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 13 illustrates an interface provided to a user.

DETAILED DESCRIPTION

Embodiments described in this application provide a tracking and coordination system, implemented by a system having one or more computer processors, that enhances an accuracy, reliability, and efficiency of storage and delivery of goods. The system may seamlessly provide one or more platforms through which participants in the tracking and coordination system may generate scannable codes such as QR codes or barcodes, reserve and/or access storage compartments, and pick up or drop off goods into the storage compartments.

Figure 1A:
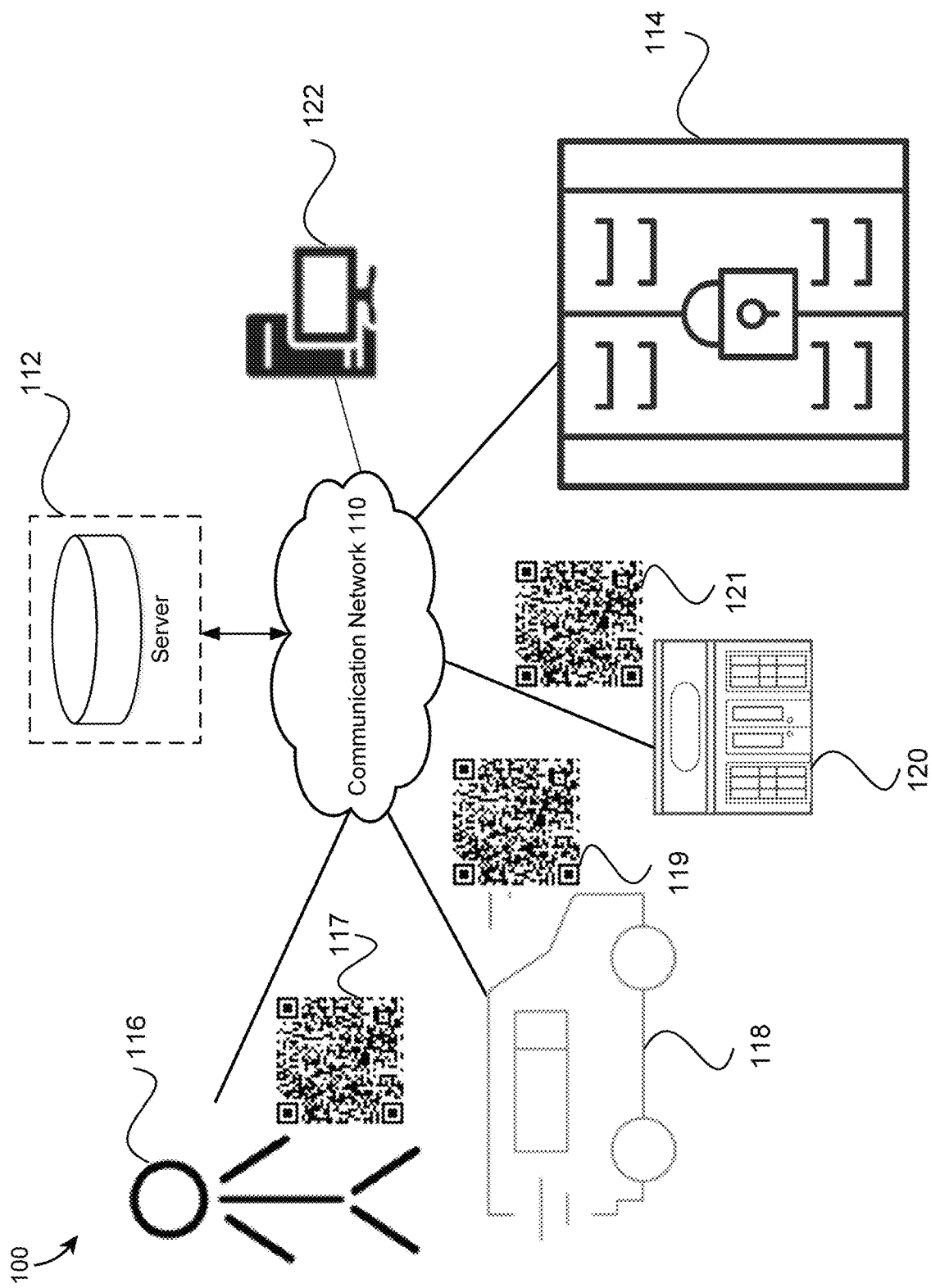
FIG. 1A illustrates an example environment of a system that coordinates operations of storage compartments between entities.

FIG. 1A illustrates an example environment 100 of a system that coordinates operations of storage compartments 114 between entities 116, 118, and 120. A first entity 116 may be an individual customer or user ordering a shipment of goods. The first entity 116 may be referred to as a requesting entity. A second entity 118 may be a carrier 118 that delivers the shipment from the storage compartments 114 to the first entity 116. A third entity 120 may be a merchant or seller of goods, and may be a physical or online merchant. The third entity 120 may be referred to as a providing entity. In some embodiments, the third entity 120 may arrange a shipment of goods to the storage compartments 114 so that the first entity 116 receives the shipment at the storage compartments 114. In some examples, the third entity 120 may have a merchant's courier to ship the goods from a location of the third entity 120 to the storage compartments 114. The merchant's courier may be a small carrier, a carrier related to the third entity 120, or a carrier that works specifically with the third entity 120. In some embodiments, the storage compartments 114 may be in a standalone location. In other embodiments, the storage compartments 114 may be at a same location as another seller or business, and may include a tablet interface having a platform that enables drop off, storage, and pickup of shipments or deliveries. In FIG. 1A, a computing system 122 may be a central computer system that includes one or more processors, engines, or modules to control or coordinate operations of the storage compartments 114, while providing secured access to the storage compartments 114 to each of the first entity 116, the second entity 118, and the third entity 120, to the storage compartments 114 via identification codes and scannable codes such as QR codes or barcodes. A communication network 110 may provide communications between the computing system 122 and the storage compartments 114, the first entity 116, the second entity 118, or the third entity 120. The server 112 may store log data of the storage compartments 114 such as previous usage data and sensor data of the storage compartments 114, which may include a temperature and/or humidity of each individual storage compartment of the storage compartments 114. The server 112 may further store scheduling information of the storage compartments 114, including times at which each storage compartment is reserved, whether any of the storage compartments 114 are shared between multiple entities, and a weight of shipments or packages inside each storage compartment. For example, some of the storage compartments 114 may be shared between multiple third entities 120 if the storage compartments 114 do not have adequate space otherwise. The server 112 may further store historical data including a log record of a temperature and/or humidity of each individual storage compartment of the storage compartments 114, and a history of use of each of the storage compartments 114. The server 112 may further store identity information of entities such as the first entity 116, the second entity 118, and the third entity 120, along with current and previous scannable codes used by each of the first entity 116, the second entity 118, and the third entity 120. The storage compartments 114 may be lockers, in some embodiments.

In some embodiments, one or more processors or engines of the computing system 122 may, via a web or mobile application provided to the first entity 116, accept or obtain identification information including a name and an address from the first entity 116 ordering a shipment. If the first entity 116 has not been previously inputted into the computing system 122, the computing system 122 may set an identification number or identification code (hereinafter "identification number") of the first entity 116. Initially, the computing system 122 may set the identification number of the first entity 116 to be a phone number of the first entity 116 and prompt the first entity 116 to set his or her own identification number. The computing system 122 may determine whether the set identification number by the first entity 116 has already been used by another entity. If the computing system 122 determines that the set identification number is already stored in the server 112, the computing system 122 may prompt the first entity 116 to reenter a different identification number until a unique identification number has been entered. If the computing system 122 determines that the set identification number has not already been stored in the server 112, the computing system 122 may permanently link the first entity 116 to the set identification number. In some embodiments, the computing system 122 may generate an identification number. In some embodiments, the set identification number and/or the identification number may comprise any of letters, numbers, or a combination of letters and numbers. The identification number may be used to authenticate the first entity 116.

In some embodiments, one or more processors or engines of the computing system 122 may receive an order or request from the first entity 116 for a shipment of goods and prompt the first entity 116 to select a pickup location and/or an estimated pickup time of the shipment. Alternatively, the one or more processors or engines of the computing system 122 may automatically select the pickup location as a pickup location having a nearest distance to the address or location of the first entity 116, and/or based on a nearest location to a route of the second entity 118. Once the one or more processors or engines of the computing system 122 makes the selection of the pickup location, the computing system 122 may confirm the selection with the first entity 116. The one or more processors or engines of the computing system 122 may generate an address label that includes the identification number and the pickup location, based on the input by the user. The address label may be sent to the third entity 120 to be placed on the shipment. Thus, the computing system 122 seamlessly coordinates between the first entity 116, the second entity 118, and/or the third entity 120 without delay, so that any relevant input provided by one of the first entity 116, the second entity 118, and/or the third entity 120 is acted upon and communicated effectively and efficiently.

In some embodiments, the one or more processors or engines of the computing system 122 may obtain a change in an address. Upon obtaining the change in the address, the one or more processors of the computing system 122 may update a pickup location and/or an estimated pickup time of the shipment. For example, the one or more processors or engines of the computing system 122 may automatically select the updated pickup location as a pickup location having a nearest distance to the changed address. Once the one or more processors or engines of the computing system 122 makes the selection of the updated pickup location, the computing system 122 may confirm the selection with the first entity 116. The one or more processors or engines of the computing system 122 may generate an updated address label that includes the identification number and the updated pickup location, based on the input by the user. The updated address label may be sent to the third entity 120 to be placed on the shipment. In some examples, the original address label may still be active and/or linked to the updated address. In some examples, the identification number may be associated and/or linked with either or both of the original address and the updated address.

In some embodiments, one or more processors or engines of the computing system 122 may, via a separate web or mobile application provided to the third entity 120, receive an indication that the third entity 120 intends to reserve a compartment of the storage compartments 122. The computing system 122 may provide secured and authorized access of the storage compartments 114 to the third entity 120, or, alternatively, to the merchant's courier, via a scannable code 121. Operations associated with delivery of the shipment to the storage compartments 114 may be performed directly by the third entity 120 or the merchant's courier of the third entity 120, though, such operations are hereinafter described with respect to the third entity 120 for simplicity. In some embodiments, the third entity 120 may receive a notification once the first entity 116 has requested a shipment of goods from the third entity 120. In some embodiments, such access to the storage compartments 114 may only be granted if the computing system 122 has detected an order or a request for a shipment by the first entity 116 to ensure that goods placed inside the storage compartments 114 have actually been requested to and that the goods are not left in the storage compartments 114 for a long time. The one or more processors or engines of the computing system 122 may accept or obtain identification information including an identifier, such as a merchant name, and/or an address of the third entity 120 that is sending a shipment to the storage compartments 114. Since the third entity 120 may have already communicated and exchanged information with the first entity 116, the third entity 120 may have identification information of the first entity 116. Thus, the computing system 122 may also receive, from the third entity 120, at least a portion of the identification information of the first entity 116. The computing system 122 may then reserve a compartment in the storage compartments 114. The computing system 122 may retrieve, for example, from the server 112, the identification number corresponding to the first entity 116 using the identification information received from the third entity 120 and transmit the identification number to the third entity 120 via web or mobile application. The computing system 122 may further generate the scannable code 121 such as a QR code or bar code that is unique to each delivery by the third entity 120. The scannable code 121 may be transmitted to the third entity 120 via the web or mobile application. The computing system may generate an address label that includes at least a portion of the identification information of the first entity 116 and transmit the address label to the third entity 120 or to the merchant's courier. Meanwhile, the identification information of the third entity 120 may be used by the computing system 122 to generate a designation number or code specific to the third entity 120. The designation number or code may be inputted by the third entity 120 or generated by the computing system 122, and may be used to authenticate the third entity 120. In some embodiments, the computing system 122 may allow the reserved compartment to be opened in response to receiving an input of the identification number corresponding to the first entity 116 or a scan of the scannable code 121. In other embodiments, the computing system 122 may provide access to a portion of the storage compartments by authenticating the third entity 120 via entry of the designation number or code, in addition to a personal identification number (PIN), even without scanning the scannable code 121.

In other embodiments, the third entity 120 may initiate a reservation of the storage compartments 114 to store shipments of goods without the first entity 116, or any other entity, requesting such a shipment. In this scenario, no address label is generated because no identification information of the first entity 116 is available since no order or request was made for that shipment. In other words, the third entity 120 may simply arrange for the shipments of goods to be stored in the storage compartments 114, so that any entity can readily purchase or obtain a shipment of the goods in the storage compartments 114 without having to order ahead of time. A risk to the third entity 120 may be that the shipments may remain unsold. The computing system 122 may track a status of whether the shipments are picked up and a frequency at which the shipments are picked up. The computing system 122 may adjust a number of compartments allotted to non pre-ordered shipments based on the tracked status, such as, a frequency at which the shipments are picked up. For example, if the non pre-ordered shipments are picked up at a low frequency, fewer compartments may be allotted to the third entity 120 to store such non pre-ordered shipments. Thus, if the third entity 120 tries to reserve more compartments than the allotted compartments to non pre-ordered shipments, the computing system 122 may not permit such reservation. Therefore, the computing system 122 may permit reservation of a compartment by the third entity 120 whenever the first entity 116 fills an order from the third entity 120, and reservation of a limited number of compartments to store shipments that have not been pre-ordered.

In some embodiments, one or more processors or engines of the computing system 122 may provide a platform for the third entity 120 to schedule a time a delivery of a shipment to the storage compartments 114 and a size of the compartment to be reserved. The computing system 122 may, upon authenticating the third entity 120, automatically select or prompt the third entity 120 to select a size of a compartment to store a shipment. First, the computing system 122 may estimate an arrival time of the shipment from the third entity 120 to determine whether a compartment having the selected size is available at the estimated arrival time, to coordinate utilization of the storage compartments 114. The computing system 122 may prompt the third entity 120 to select an estimated arrival time of the shipment. Alternatively, the computing system 122 may automatically select the estimated arrival time based on historical data of the third entity 120, such as a scheduled time of daily arrival of the third entity 120 at the storage compartments 114, or an average time of actual arrival of the third entity 120 at the storage compartments 114, while taking into account predicted traffic from a location of the third entity 120 to the storage compartments 114. Alternatively, the computing system 122 may automatically select the estimated arrival time based on a selection of a carrier and/or carrier service by the third entity 120. Once the one or more processors or engines of the computing system 122 makes the selection of the estimated arrival time, the computing system 122 may confirm the selection with the third entity 120. The computing system 122 may further determine whether a compartment having the selected size is available at the selected pickup location between the estimated arrival time by the third entity 120 and the estimated pickup time by the first entity 116, or by the second entity 118. The computing system 122 may, in response to determining that the compartment of the selected size is available, reserve the compartment of the selected size between the estimated arrival time of the carrier and the estimated pickup time. The computing system 122 may, in response to determining that a compartment of the selected size is unavailable, determine a nearest pickup location to the first entity 116 at which a compartment of the selected size is available, update or change the selected pickup location to the nearest pickup location, and inform the first entity 116 of the updated selected pickup location. In some embodiments, the computing system 122 may, in response to determining that a compartment of the selected size is unavailable, determine whether a sharable compartment of the selected size is available between the estimated arrival time by the third entity 120 and the estimated pickup time. In response to determining that the sharable compartment is available, the computing system 122 may select a sharable compartment to be reserved. The computing system 122 may make the selection based on a remaining space available in the sharable compartments. For example, the computing system 122 may select a sharable compartment having a largest remaining space. In other examples, the computing system 122 may select a sharable compartment having just enough remaining space to fit the shipment (e.g., having a remaining amount of space that is closest to and exceeds dimensions of the shipment). In some embodiments, a sharable compartment may be one in which the third entity 120 is already reserving to store an other shipment, or in which all entities involved (e.g., the first entity 116, the second entity 118, and/or the third entity 120, and/or additional first entities, second entities, and third entities) authorize sharing.

In some embodiments, one or more processors or engines of the computing system 122 may, upon receiving an entry of the designation number or a scan of the scannable code 121 from the third entity 120, open the reserved compartment. In response to the third entity 120 unsuccessfully scanning the scannable code 121 or unsuccessfully entering the designation code, the computing system 122 may prompt the third entity to try another authentication method until the third entity 120 is authenticated. Upon authenticating the third entity 120, determining that the first entity 116 has ordered or requested a shipment from the third entity 120, and/or that the third entity has already reserved a compartment, the computing system 122 may control an opening of the reserved compartment. The computing system 122 may detect that the shipment has been placed inside the reserved compartment, for example, by using one or more weight sensors to detect a change in weight resulting from the shipment being placed inside the reserved compartment, and/or by an image sensor inside the reserved compartment detecting the shipment. In some embodiments, in response to the computing system 122 determining that reserved compartment remains empty for an amount of time after the estimated arrival time, the computing system 122 may cancel the reservation of the originally reserved compartment so that the originally reserved compartment is open for storage by other entities. For example, if after 24 hours have passed from the estimated arrival time and the reserved compartment is still empty, the computing system 122 may cancel the reservation of the originally reserved compartment. In some embodiments, the computing system 122 may prompt the third entity 120 to indicate whether the third entity 120 still intends to reserve the reserved compartment. In response to the third entity 120 positively indicating an intent to use the reserved compartment, the computing system 122 may prompt the third entity 120 to indicate an updated estimated arrival time, update the estimated arrival time to the updated estimated arrival time, change or update the estimated pickup time based on the updated estimated arrival time, and communicate the updated estimated pickup time to the first entity 116. If the first entity 116 chooses to cancel the order or request for the shipment, the computing system 122 may communicate the cancellation to the third entity 120. The computing system 122 may update the first entity 116 regarding any delays in delivery.

In some embodiments, one or more processors or engines of the computing system 122 may, in response to opening the selected compartment, determine whether the selected compartment is a proper size for the shipment. In some examples, if the computing system 122 determines that the selected compartment is not large enough for the shipment, for example, as a result of the third entity 120 not being able to fit the shipment inside the selected storage compartment, the computing system 122 may change the currently selected compartment to another larger compartment that is available to hold the shipment and reserve the another larger compartment. The computing system 122 may cancel the reservation of the storage compartment once the another larger storage compartment is reserved. In some examples, if the computing system 122 determines that the selected compartment is too large for the shipment (e.g., the shipment can fit inside a smaller storage compartment), the computing system 122 may search for an availability of a smaller storage compartment, request the third entity 120 to place the shipment inside the smaller storage compartment, and reserve the smaller storage compartment while cancelling the reservation of the originally selected storage compartment. In such a manner, the computing system 122 may save space and reduce wasted space by ensuring that a shipment is placed in a properly sized storage compartment.

In some embodiments, one or more processors or engines of the computing system 122 may detect that the shipment is placed inside a compartment of the storage compartments 114, for example, via a weight sensor or load cell, or via image recognition using one or more image sensors inside the compartment. In response, the one or more processors of the computing system 122 may, via a wrapper and/or other applications programming interface (API), transmit such an indication to the second entity 118 and/or the first entity 116. The computing system 122 may generate a carrier code 119 to be provided to the second entity 118 to deliver the shipment from the storage compartments to the first entity 116, in response to such detection. Alternatively or additionally, the computing system 122 may generate a second scannable code 117 to be provided to the first entity 116 which allows the compartment to be opened upon scanning of the second scannable code 117, and allows the first entity 116 to retrieve the shipment. In some embodiments, the scannable code 121 provided to the third entity 120 may be disabled or deactivated so that only the first entity 116 or the second entity 118 can retrieve the shipment from the storage compartments 114. Instead of or in addition to providing the first entity with the second scannable barcode, the one or more processors or engines of the computing system 122 may provide a pickup code instead of the second scannable code 117 to the first entity 116, which the first entity 116 or a representative at the location of the storage compartments 114 may manually type in. The second scannable code 117 or the pickup code may be linked to the identification number. In some embodiments, the first entity 116 may be required to input both the pickup code and a security personal identification number (PIN) generated by the computing system 122. In some embodiments, the first entity 116 may be required to input both the second scannable code 117 and a security personal identification number (PIN) generated by the computing system 122.

In some embodiments, the computing system 122 may ensure that the first entity 116 or the second entity 118 retrieves a proper shipment in a sharable compartment to ensure that the shipment received by the first entity 116 or the second entity 118 has actually been requested by or belongs to the first entity 116, and eliminate the possibility of the first entity 116 or the second entity 118 taking another shipment belonging to an other entity, for example. If the computing system 122 determines that the first entity 116 or the second entity 118 has retrieved an improper shipment from a sharable compartment, the computing system 122 may issue an alert such as an alarm. The computing system 122 may determine whether the first entity 116 or the second entity 118 has retrieved an improper shipment by determining a weight of each shipment in the sharable compartment and identifying which entity each shipment belongs to.

The weight of each shipment placed inside the sharable compartment may be determined by the computing system 122. The computing system 122 may link the shipment, weight of the shipment, and/or shape of the shipment placed inside the sharable compartment with the designation number entered by the third entity 120, and/or with the scannable code 121 scanned by the third entity 120. Since the second scannable code 117, the pickup code, or the carrier code 119 is linked with the identification number of the first entity 116 or an identification of the second entity 118, the computing system 122 may determine whether a weight of a shipment picked up by the first entity 116 or the second entity 118 is linked with. If the weight of a shipment picked up by the first entity 116 or the second entity 118 is not linked with (e.g., does not match) the second scannable code 117, the pickup code, or the carrier code 119, the computing system 122 may determine that the first entity 116 or the second entity 118 has picked up an incorrect shipment and issue an alert such as an alarm. As an example, the third entity 120 may have placed a first shipment weighing five pounds and a second shipment weighing ten pounds into the sharable compartment. The first entity 116 may scan the second scannable code 117 or input the identification number, indicating that the first entity 116 is supposed to pick up the first shipment weighing five pounds. If the first entity 116 picks up the second package weighing 10 pounds, the computing system 122 may detect that the weight of the second package (10 pounds) is not linked with the first identification number linked to the second scannable barcode and generate an alarm. If the first user picks up the first package weighing 5 pounds, the computing system 122 may detect that the weight of the second package is linked with the second scannable barcode.

In some examples, the computing system 122 may provide a notification to the first entity 116 that other goods have been placed in one or more other compartments of the storage compartments 114, in the scenario that the third entity 120 has placed one or more shipments of goods that have not been pre-ordered, so that the first entity 116 can readily order or pick up a shipment of goods. For example, a shipment may be placed in a compartment by the third entity 120. The first entity 116 may decide to order or pick up the shipment that has not been pre-ordered. Upon the computing system 122 processing a payment from the first entity 116, the computing system 122 may generate a third scannable code or a second pickup code so that upon scanning or entering, the first entity 116 may open a compartment having the shipment and pick up the shipment.

In some embodiments, in response to determining that the (pre-ordered) shipment has not been retrieved by the first entity 116 or the second entity 118 at the estimated pickup time, the computing system 122 may make the compartment in which the shipment is placed to be available for sharing by other entities so that other shipments can also be placed in the same compartment. In some embodiments, in response to determining that the shipment has not been retrieved by the first entity 116 or the second entity 118 at the estimated pickup time, and in response to determining that the reserved storage compartment is not reserved by another entity at the estimated pickup time, the computing system 122 may prompt the first entity 116 or the second entity 118 to input an updated estimated pickup time, and update to the updated estimated pickup time inputted by the first entity 116 or the second entity 118.

In some embodiments, one or more processors or engines of the computing system 122 may continuously detect a temperature and a humidity inside each of the storage compartments, determine whether the respective temperature and the respective humidity inside each of the storage compartments are within respective allowable ranges, and in response to a temperature or a humidity inside one of the storage compartments not being within a respective allowable range, adjust the temperature or the humidity inside one of the storage compartments to be within the respective allowable range.

Figure 1B:
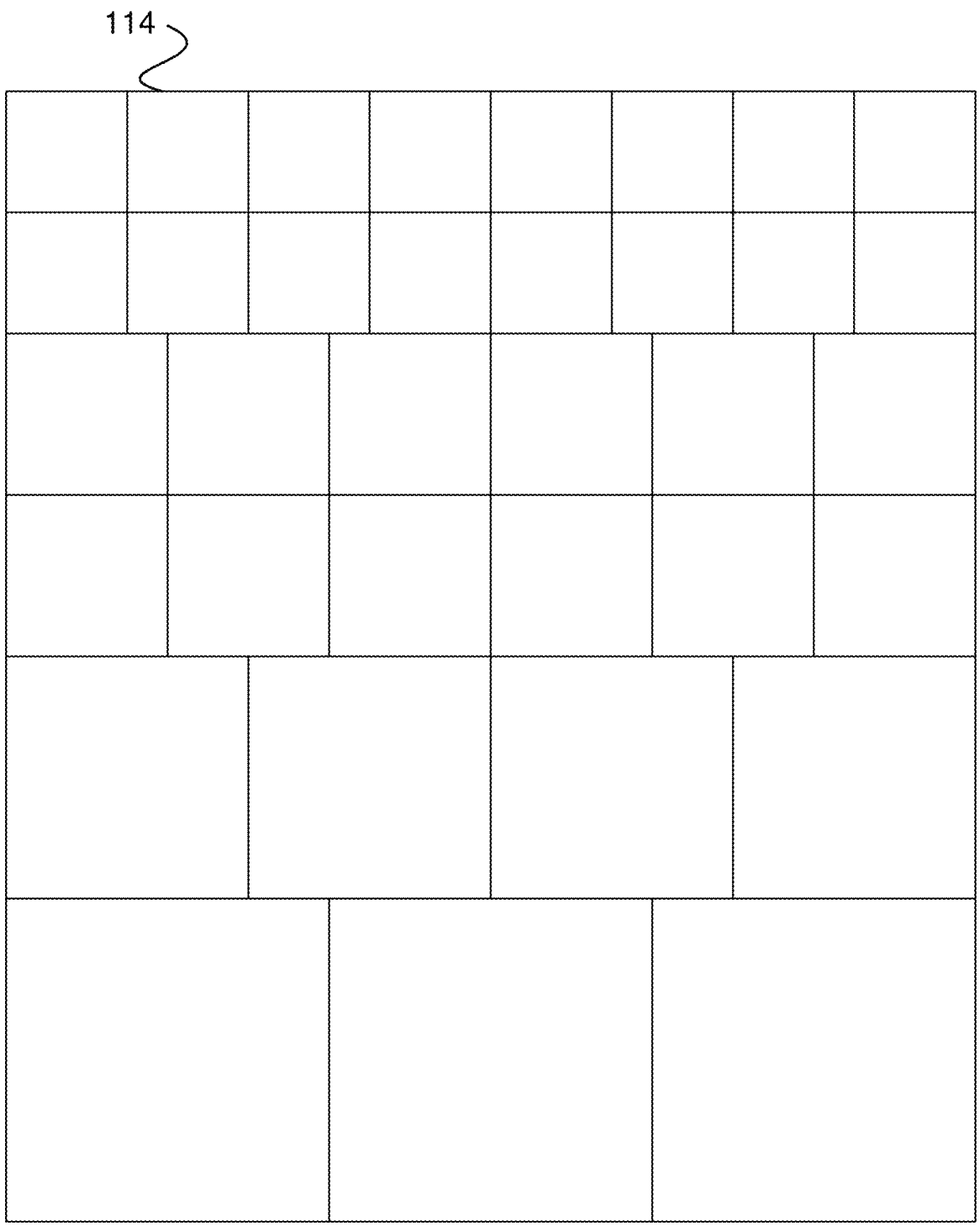
FIG. 1B illustrates an exemplary embodiment of the storage compartments of FIG. 1A.

FIG. 1B illustrates an exemplary embodiment of the storage compartments 114 of FIG. 1A, such as a locker. In FIG. 1B, the storage compartments 114 comprises storage compartments of different sizes. Although each of the storage compartments are shown as square shaped, some of the storage compartments may be differently shaped, such as rectangular shaped. In other embodiments, the storage compartments 114 may all be of a same size.

Figure 2A:
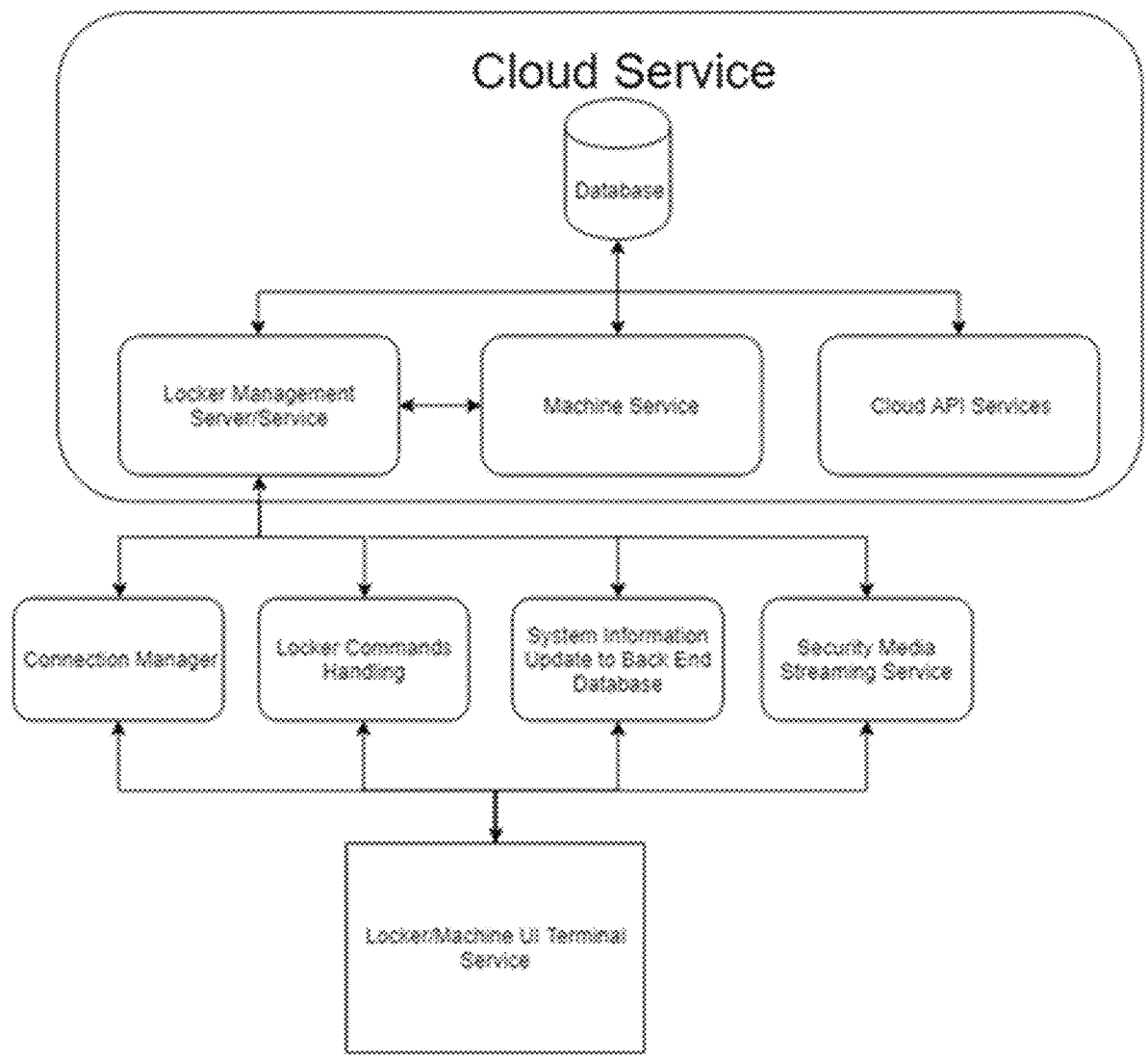
FIGS. 2A-2B illustrate exemplary diagrams of a computing system.
Figure 2B:
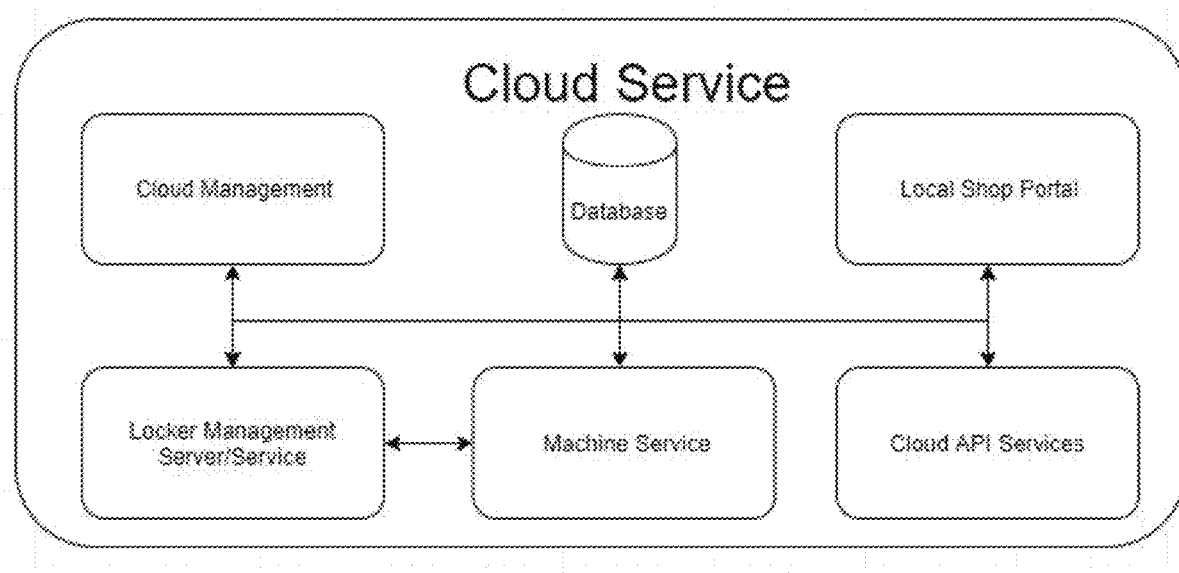

FIGS. 2A-2B illustrate exemplary diagrams of a computing system such as computing system 122. In FIG. 2A, the computing system may include a cloud service. The cloud service may further include a storage compartment (e.g., locker) management service, a locker machine service, and one or more cloud API (application programming interface) services, for example, to interface with carriers (e.g., the second entity 118), the first entity 116, and the third entity 120. In some embodiments, separate APIs may be used to interface with each carrier and separate APIs may be used to interface with the first entity 116 and the third entity. In some embodiments, the locker management service manages operations of the storage compartments (e.g. lockers) including locker connections, locker security, and locker monitoring. In some embodiments, the machine service may comprise an API communicating with each locker to perform deliveries and pickups. In some embodiments, the cloud API services may comprise API services that generate scannable codes 121 and second scannable codes 117 for the third entity 120 and the first entity 116, respectively, and reserve individual compartments. The cloud API services may further communicate a status and availability of the individual compartments to the third entity 120.

In some embodiments, a connection manager may ensure that the lockers are able to connect via a communication protocol such as TCP (transmission control protocol). In some embodiments, a locker commands handling feature, which will be described in more detail in FIG. 3, includes handling commands such as locker registration to register the lockers to the locker machine service, a health check that runs a series of health checks that is sent back to the locker machine service to ensure that parameters in the lockers are within thresholds, and a heart beat that runs a heartbeat process to ensure processes, commands, and operations are properly synced. In some embodiments, a system information update to back end database updates the locker information to a back end database, such as a database shown as part of the cloud service. In some embodiments, a security media streaming service may send video or audio from the lockers to the database. In some embodiments, a locker/machine UI terminal service may comprise a terminal on each individual locker.

In FIG. 2B, the cloud service may further comprise a cloud management server or service and a local shop portal. The cloud management server may be configured to manage accounts of the first entity 116, the third entity 120, a carrier such as the second entity 118, or other vendors such as other managers of the physical lockers. The cloud management server may further generate activity logs of the user, the first entity 116, the third entity 120, or a carrier such as the second entity 118, provide alerts to the first entity 116, the third entity 120, or a carrier such as the second entity 118, and management of payments. The local shop portal may comprise a direct link for a local or online merchant and a local market place for local vendors to place items online and deliver locally to lockers.

Figure 3:
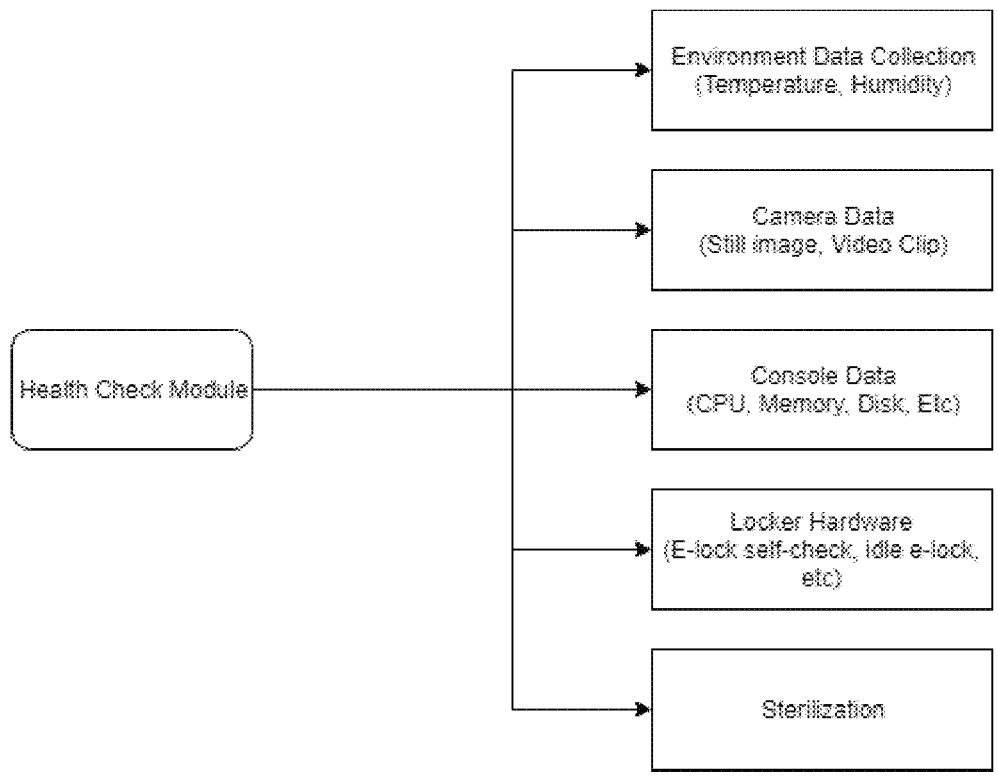
FIG. 3 illustrates an exemplary diagram of a component of the computing system.

FIG. 3 illustrates an exemplary diagram of a component of the computing system. In FIG. 3, a locker health check engine, module, or processor may be implemented as part of the locker commands handling of FIG. 2A. In some embodiments, the locker health check engine, module, or processor may determine whether the locker is running smoothly and properly. In some embodiments, the locker health check engine, module, or processor may collect environment data continuously, such as temperature and humidity inside each locker, and report the temperature and humidity back to the machine service. In some embodiments, the locker health check engine, module, or processor may collect console data including CPU, memory, and disk utilization rate and send the data back to the machine service. In some embodiments, the camera data may comprise locally stored picture and/or motion picture data that may be sent back to the machine service. In some embodiments, the health check module may comprise a sterilization engine that detects germs or bacteria in a locker, or a concentration or distribution of germs or bacteria, and sterilizes the germs or bacteria in a locker.

Figure 4:
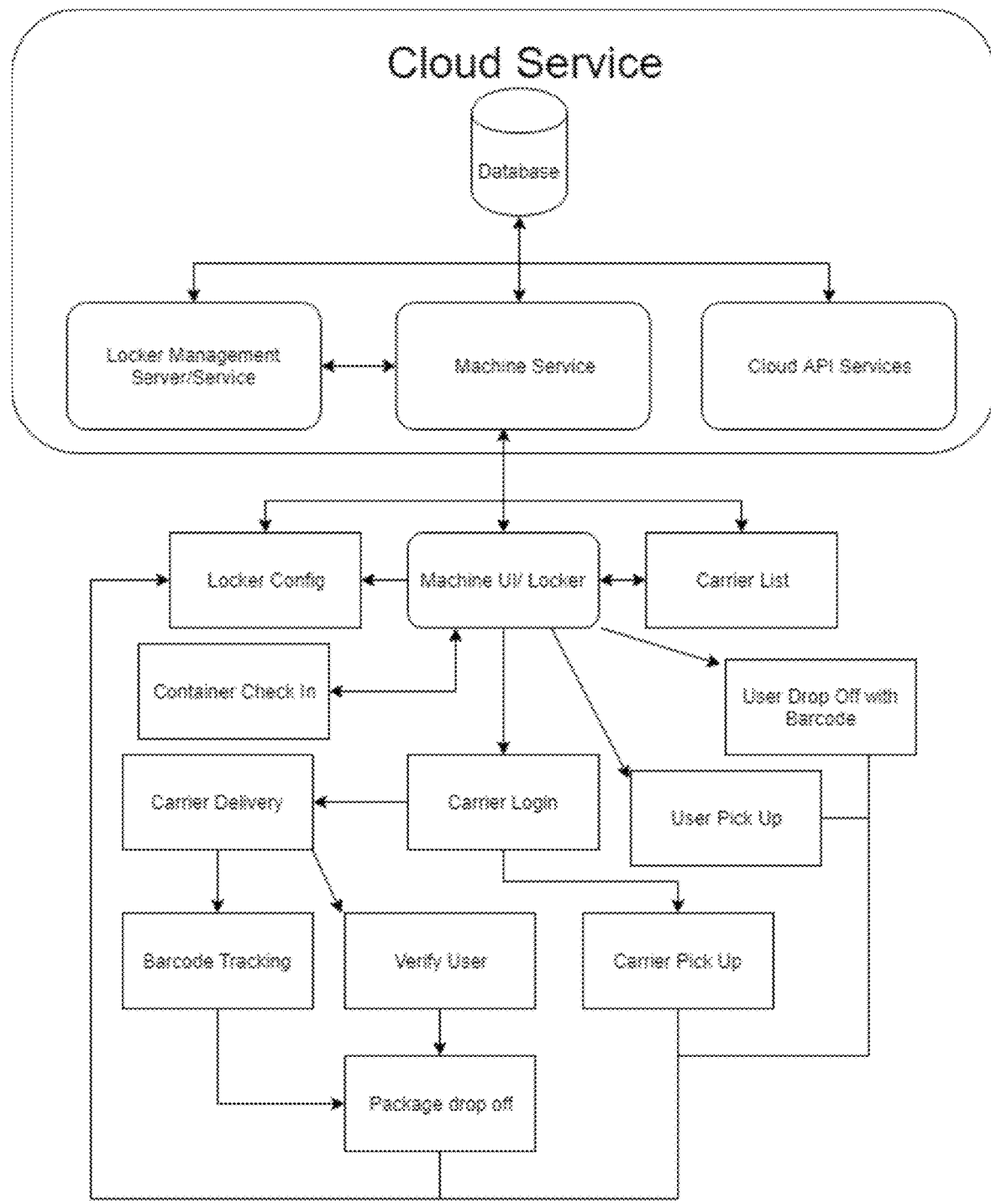
FIG. 4 illustrates an exemplary diagram of a component of the computing system.
Figure 5A:
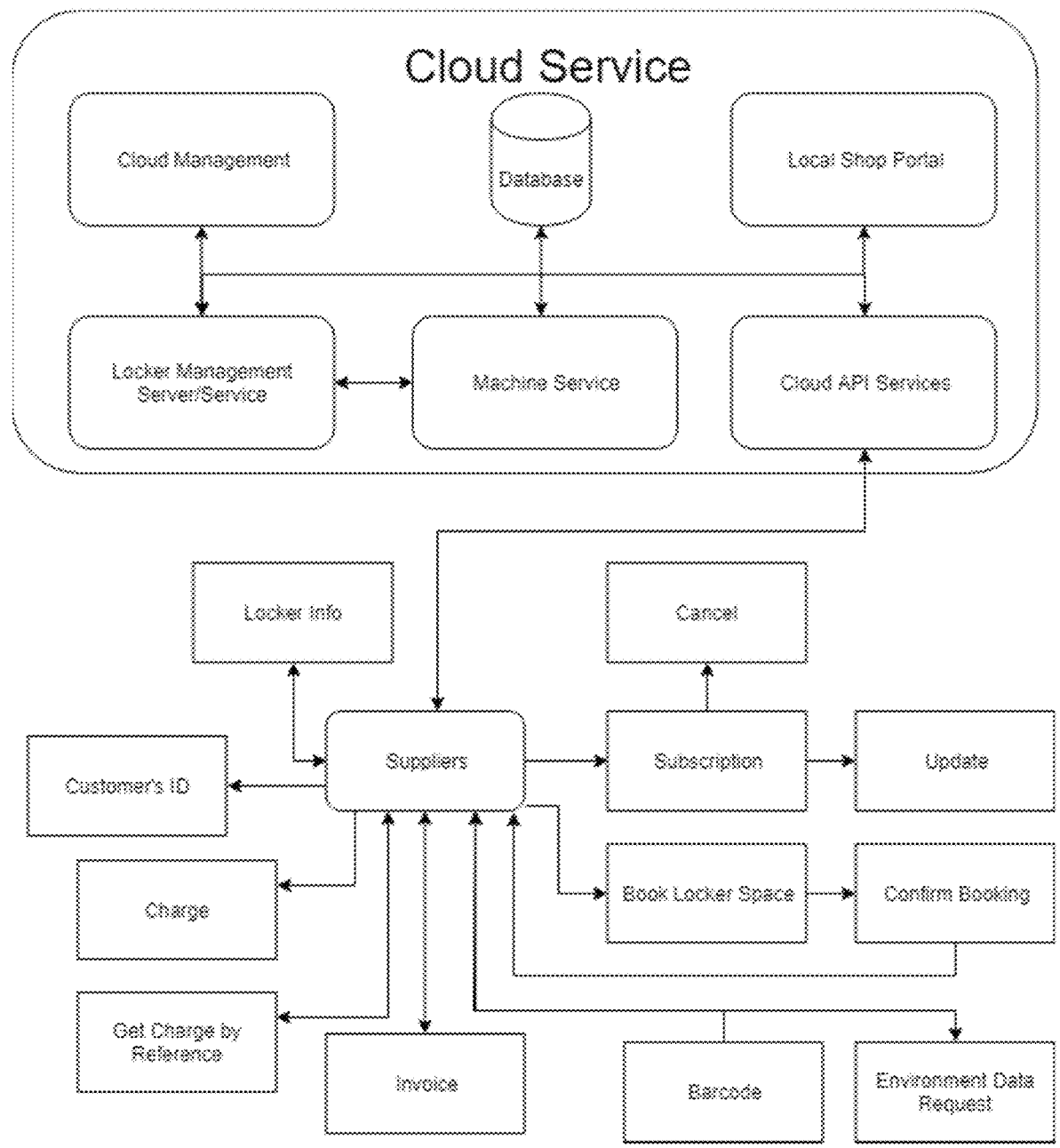
FIGS. 5A-5E illustrate exemplary diagrams of a component of the computing system.
Figure 5B:
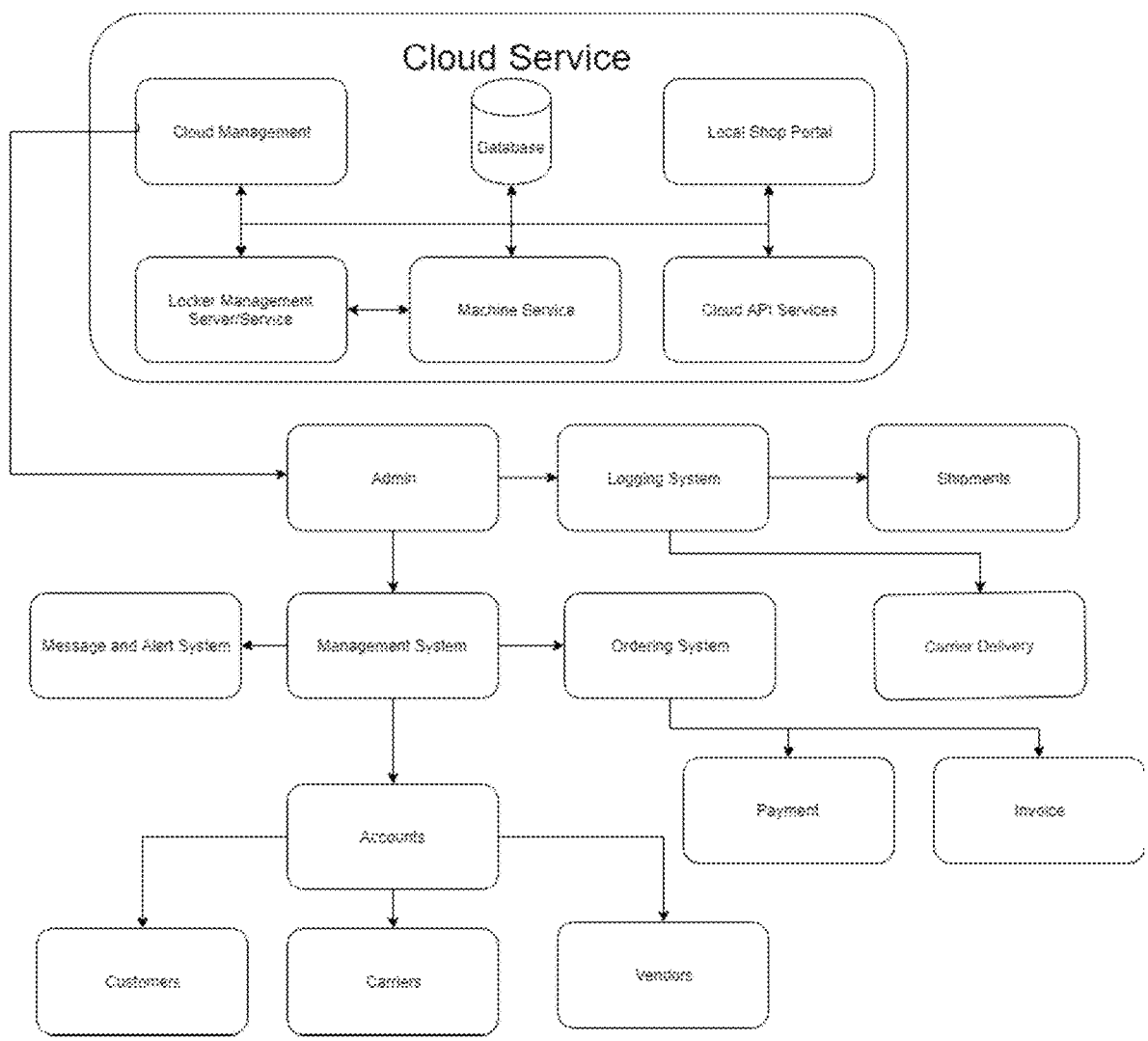
Figure 5C:
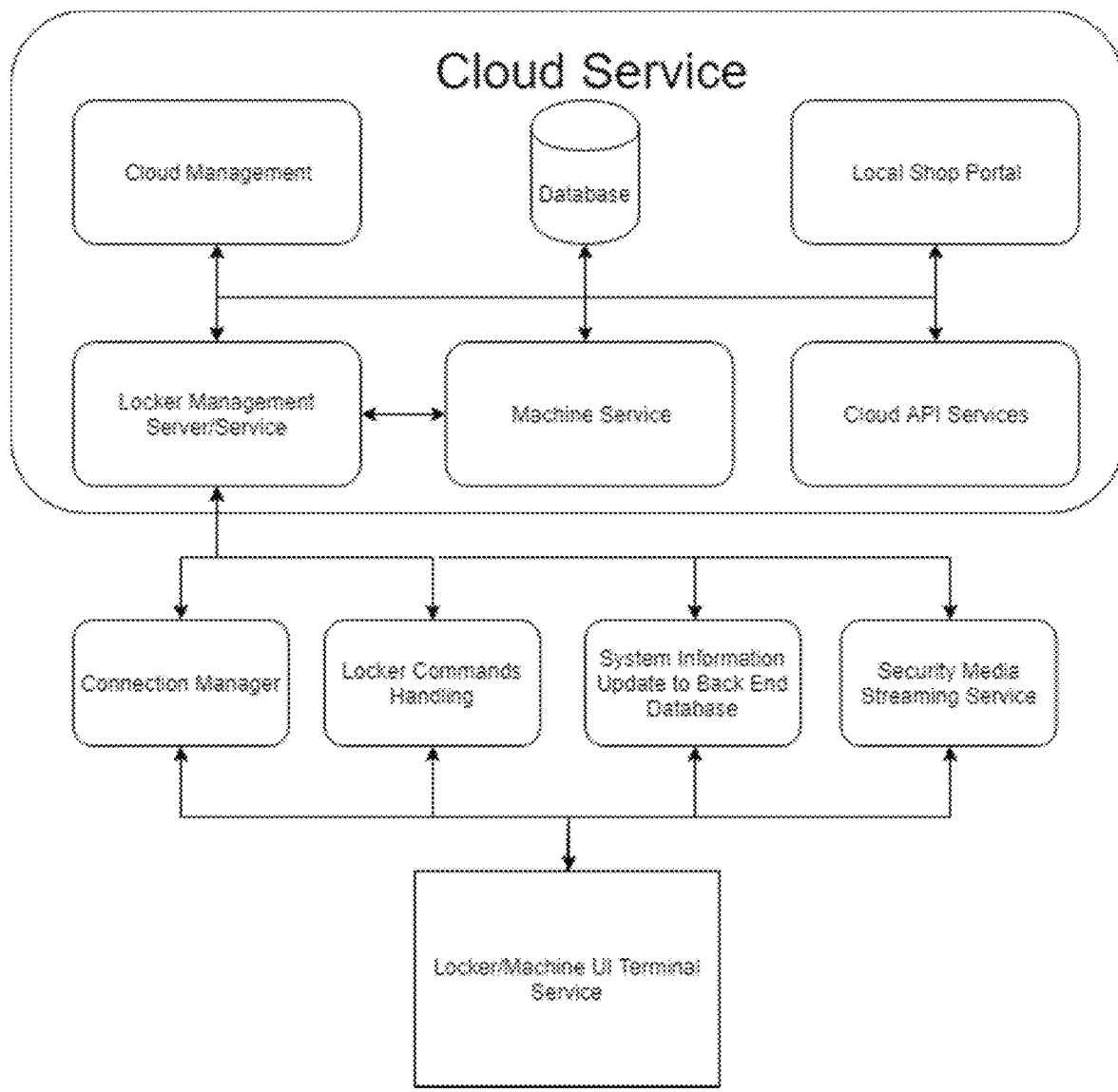
Figure 5D:
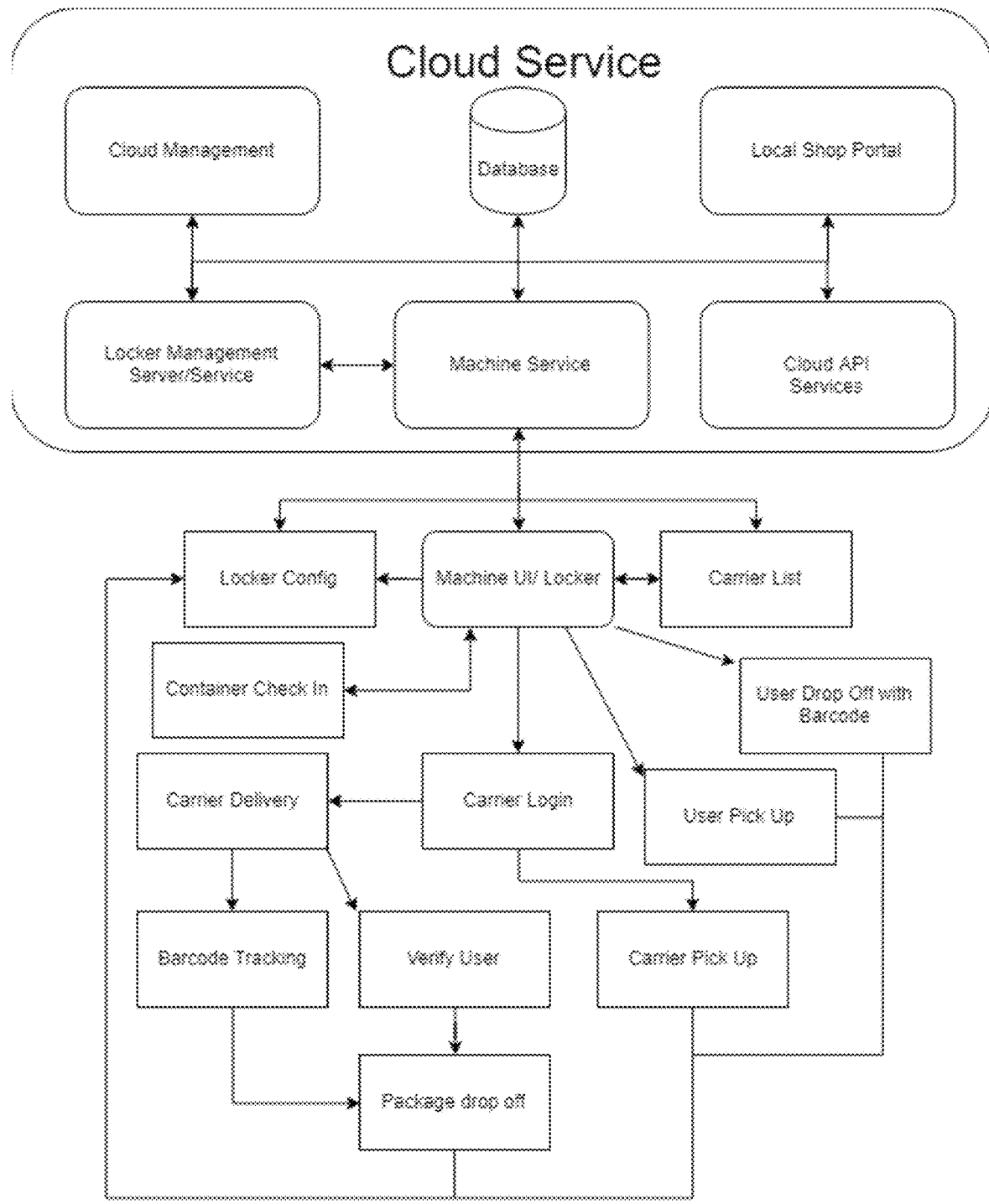
Figure 5E:
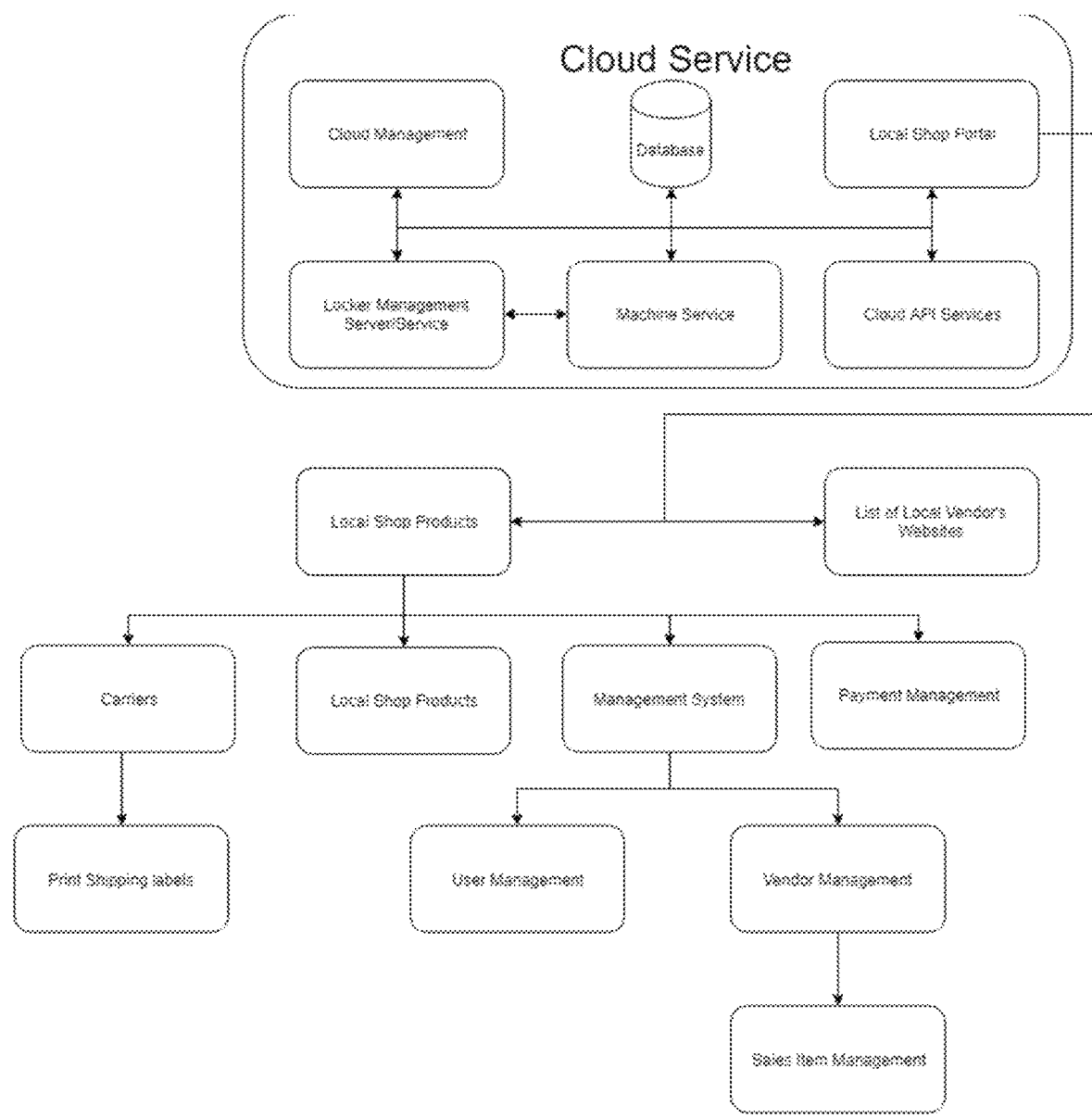

FIG. 4 illustrates an exemplary diagram of a component of the computing system. In FIG. 4, a locker machine service flow diagram may be implemented. A machine UI/locker function may comprise machine communication software contained in each locker. A carrier list function may comprise a list of carriers and respective log in codes from the Cloud Service. A locker config function may be configured to update current locker information including reservations and scheduling, and send the updated current locker information to the Cloud Service. A user drop off with barcode function may allow the first entity 116 to use a barcode or other scannable code, which may be a same code as the second scannable code 117 or a different scannable code, to drop off his or her package for a carrier to pick up. A user pick up function may allow the first entity 116 to pick up a package with a pickup code or the second scannable code 117 as described in FIG. 1A. The pickup code and the second scannable code 117 may be used only one time. A carrier login function may allow the carrier such as the second entity 118 to log in using a unique log in code. A carrier delivery function may allow the carrier to make deliveries to the first entity 116. A barcode tracking function may allow the carrier to scan the carrier code 119, as described in FIG. 1A, within the database for quick and instant delivery to the first entity 116 without providing additional information. A verify user function may verify that the first entity 116 is a proper person by verifying a first name, a last name, an identification information, and/or contact information such as phone number. A package drop off function may verify that the third entity 120 places the package into a designated drawer (e.g., storage compartment). A carrier pick up function may allow the second entity 118 to pick up any package to be shipped to the first entity 116.

FIGS. 5A-5E illustrate exemplary diagrams of a component of the computing system. FIGS. 5A-5E illustrate components and/or features of the cloud API services to be accessed by suppliers. The suppliers may include merchants such as the third entity 120 or carriers such as the second entity 118 using the API to create bookings or scannable codes. Locker info may comprise retrieved information on any available compartment using a zip code or address of the locker. A subscription feature may create a subscription for a recurring order, cancel the subscription, or may update information within the subscription such as name, phone number, address, or price. A customer's ID feature may retrieve a customer's (e.g., of the first entity 116) identification information used to generate the second scannable codes 117 or the third scannable codes. The customer's (e.g., the first entity 116) identification information may be unique as described in FIG. 1A. A charge feature may generate a charge which holds the customer's order information. A get charge by reference feature may retrieve any charge information using a reference number. An invoice feature may generate an invoice for a supplier with information about the customer's subscription within a certain time frame. A barcode feature may generate the scannable code 121 which may be used by the third entity 120 to make deliveries at a locker. A book locker space may book or reserve a drawer (e.g., compartment) in a locker to make deliveries. A confirm booking feature may confirm that the drawer is booked or reserved. One of the cloud API services may provide environment data, such as temperature, humidity, or sterilization data, to a customer and to a merchant, such as the first entity 116 and the third entity 120.

Figure 6:
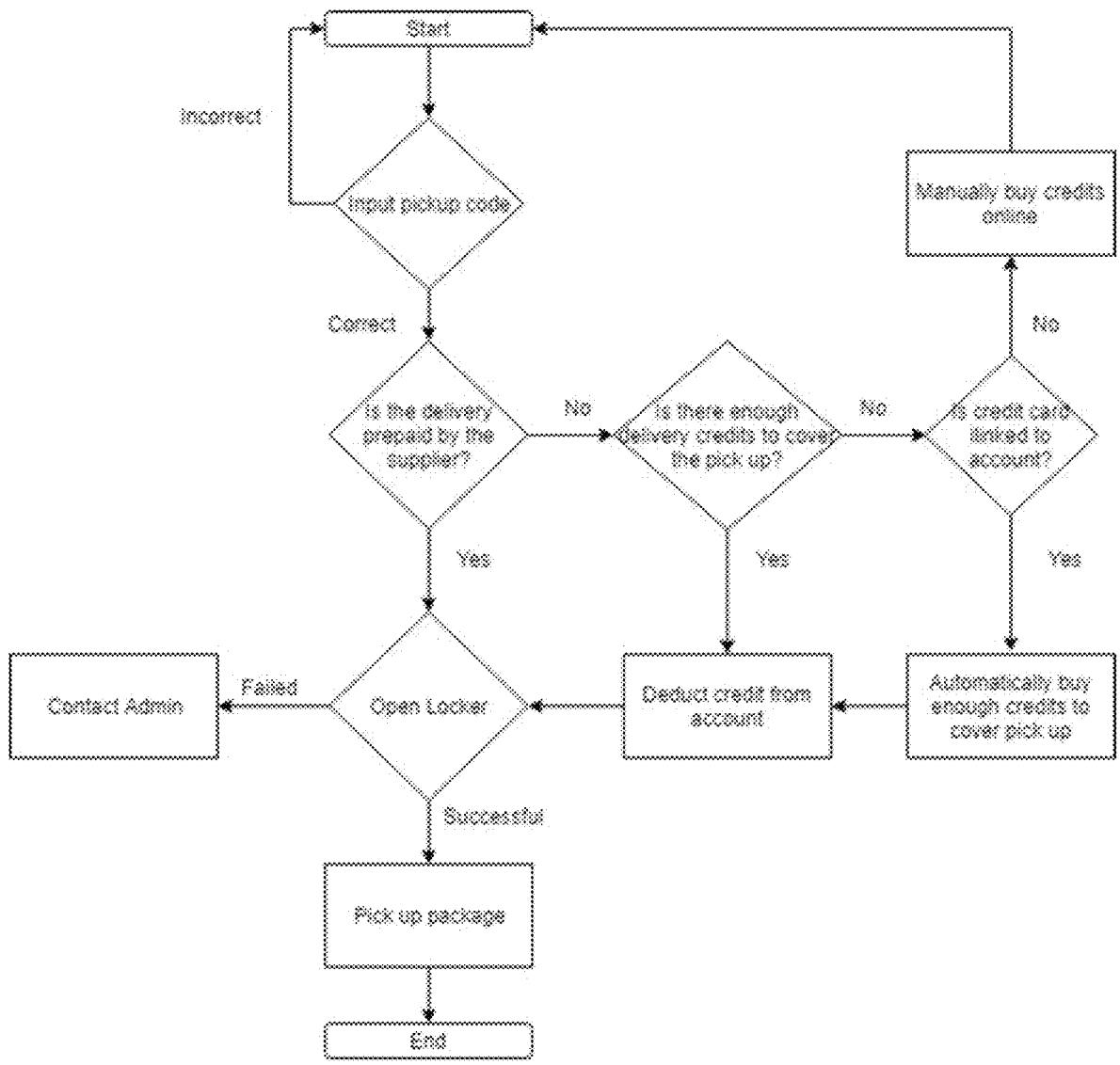
FIG. 6 illustrates an exemplary flowchart of a component of the computing system.

FIG. 6 illustrates an exemplary flowchart of a component of the computing system. FIG. 6 illustrates a pickup flow diagram by the first entity 116. In FIG. 6, the first entity 116 may enter in a pickup code or scan the second scannable code 117 to enable the computing system 122 to open a compartment of a locker. If the pickup code or the second scannable code 117 is recognized as correct, the locker service obtains information including a particular compartment in which the shipment is held and whether the first entity 116 needs to pay a pick up fee. If the first entity 116 needs to pay for the pick-up fee, a corresponding fee may be deducted from a balance of the first entity 116. If the balance is insufficient, the computing system 122 may prompt the first entity 116 to add to the account. After a successful opening of the compartment, the first entity 116 takes the shipment and the locker service subsequently closes the compartment. The computing system 122 may be updated to reflect that the shipment has been picked up.

Figure 7:
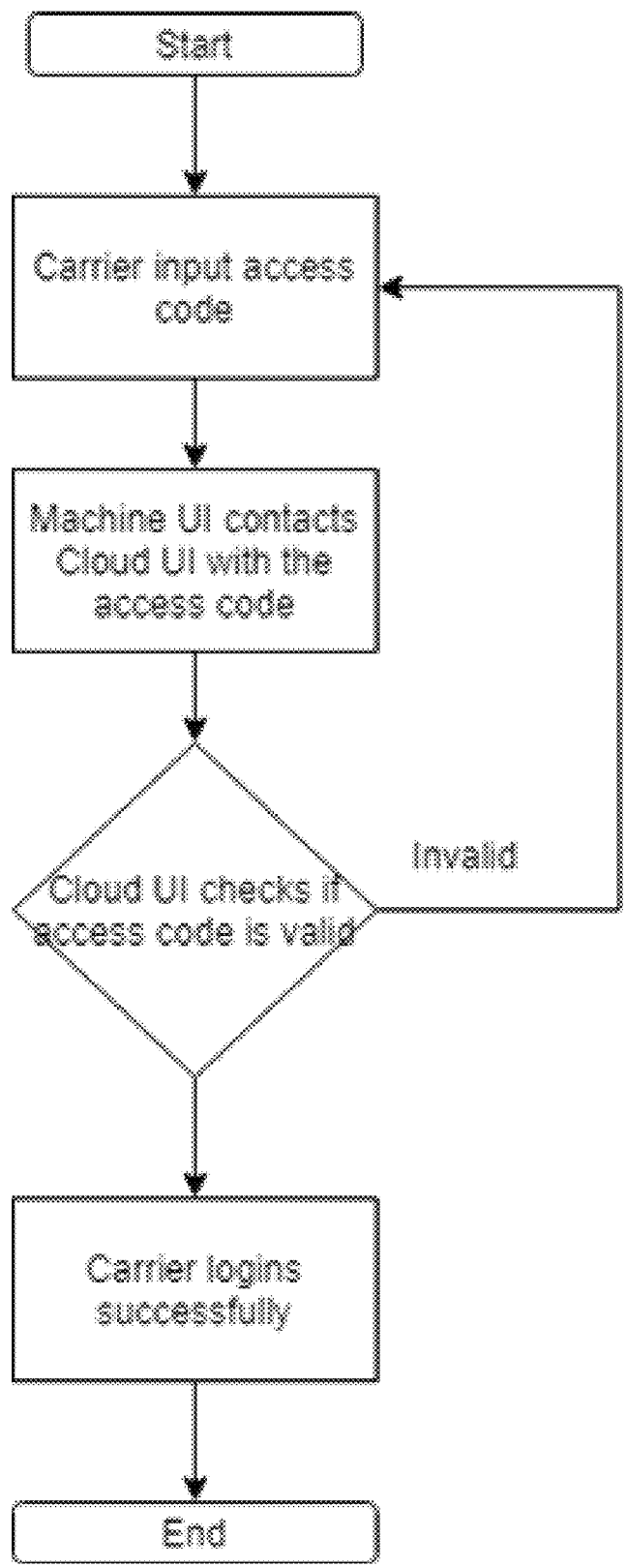
FIG. 7 illustrates an exemplary flowchart of a component of the computing system.

FIG. 7 illustrates an exemplary flowchart of a component of the computing system. FIG. 7 illustrates a carrier locker verification flow diagram. When the carrier (e.g., the second entity 118) logs in, the locker may call an access code verification interface to determine whether the access code, which may be distinct from the carrier code 119 that enables the carrier to retrieve a shipment for delivery, is correct or not. If the access code is correct, the carrier can log in for the operation.

Figure 8:
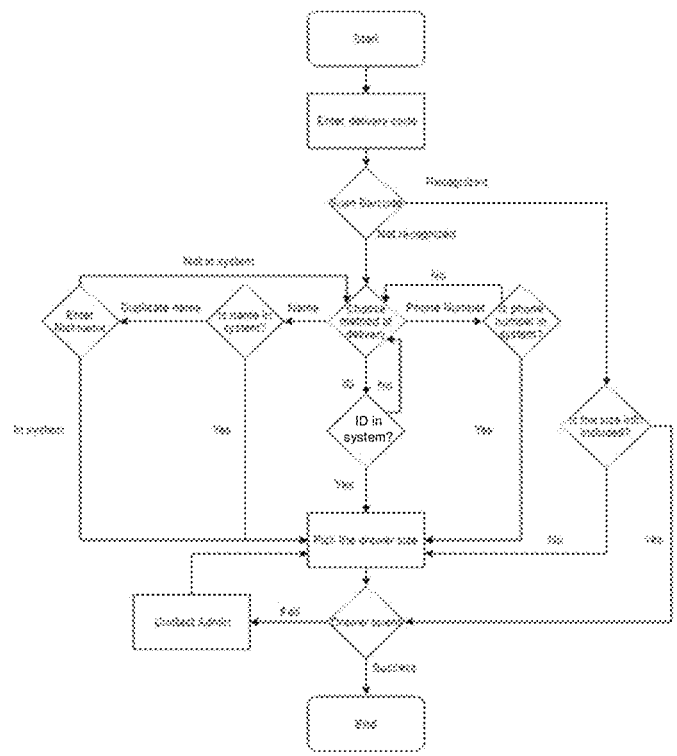
FIG. 8 illustrates an exemplary flowchart of a component of a computing system.

FIG. 8 illustrates an exemplary flowchart of a component of a computing system. FIG. 8 illustrates a process by which the third entity 120 transports a shipment to the locker (e.g., storage compartments 114). The third entity 120 may scan the scannable code 121. If the scannable code 121 is recognized, the computing system 122 may allow the carrier to deliver the package. If the scannable code 121 is not recognized, the third entity 120 may input a name, designation information, or contact information of the third entity 120. After the computing system 122 determines a match between the name, identification information, or contact information such as phone number of the third entity 120 with an entry of the third entity 120 who has reserved a storage compartment (e.g., drawer), the third entity 120 may select a drawer size (e.g., size of a compartment) and place the shipment into the drawer for pick up by the first entity 116.

Figure 9:
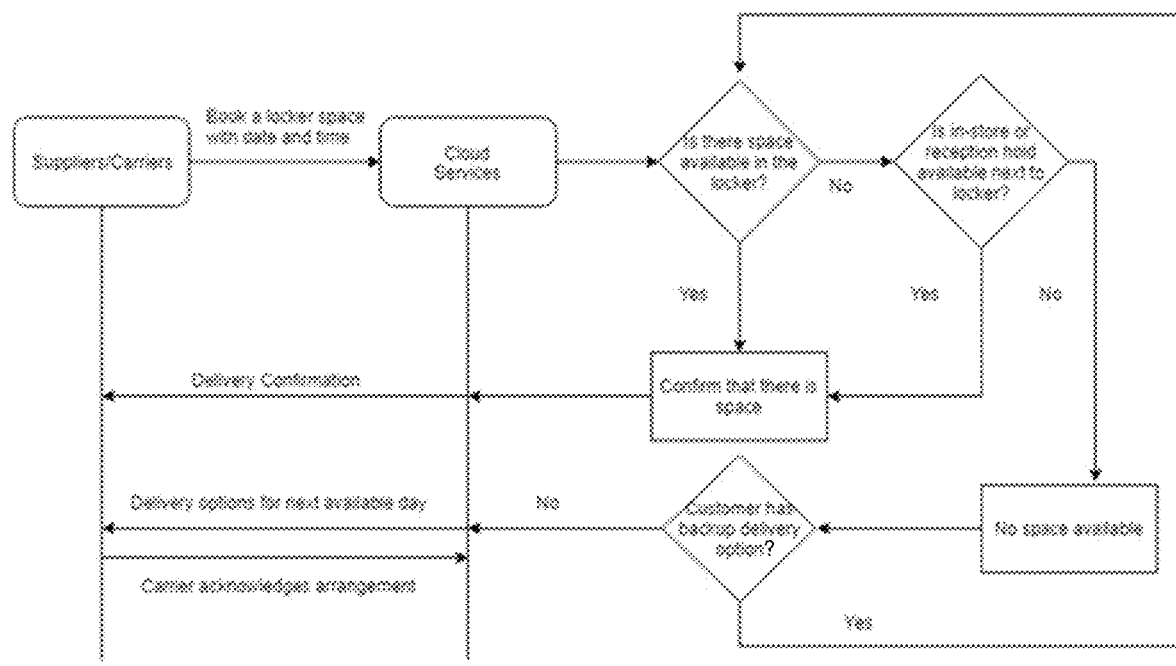
FIG. 9 illustrates an exemplary flowchart of a component of a computing system.

FIG. 9 illustrates an exemplary flowchart of a component of a computing system. In FIG. 9, if no space is available in a locker, the computing system 122 may determine whether a temporary place to store a shipment is available next to the locker, such as inside a store or a reception kiosk. In some embodiments, the computing system may search for other spaces available in another locker if no space is available in that locker or next to the locker. Otherwise, the shipment may be delayed until space is available in the locker. In some embodiments, the computing system may provide an option to the first entity 116 as to whether the first entity 116 chooses a farther, alternative locker or to delay the shipment.

Figure 10:
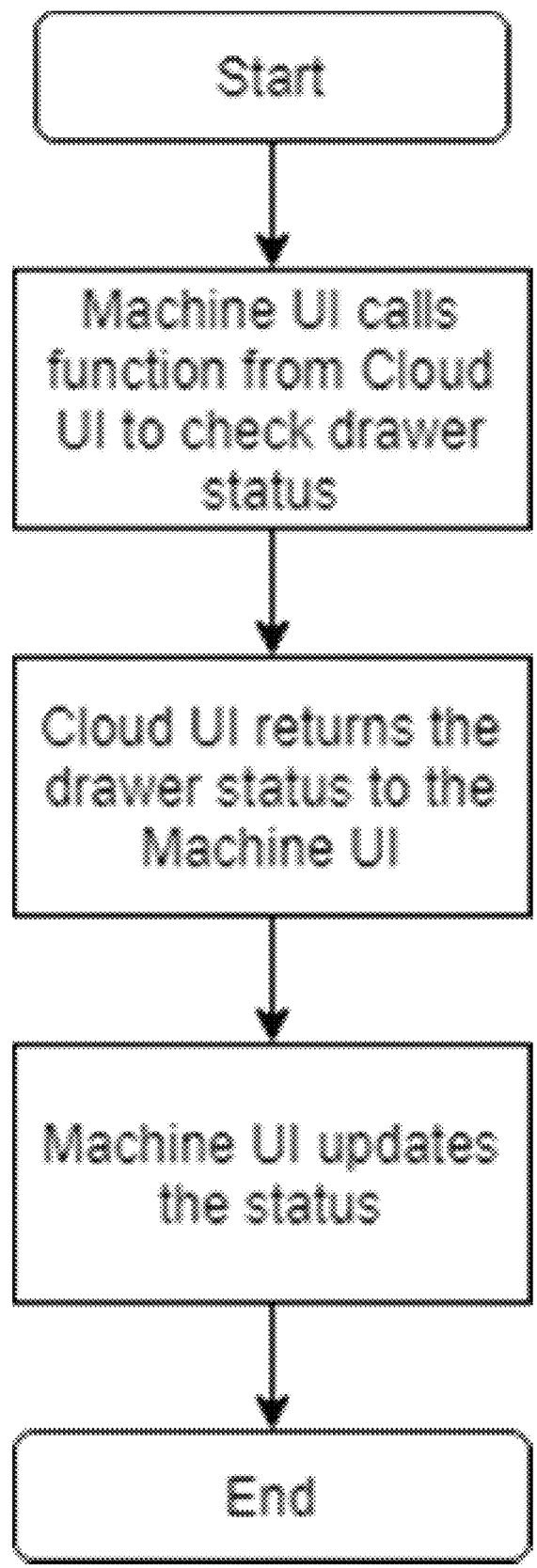
FIG. 10 illustrates an exemplary flowchart of a component of a computing system.

FIG. 10 illustrates an exemplary flowchart of a component of a computing system. FIG. 10 illustrates a locker configuration updating flow diagram. A locker may call a function to retrieve drawer status from the Cloud Service. The locker may then update its configuration.

Figure 11:
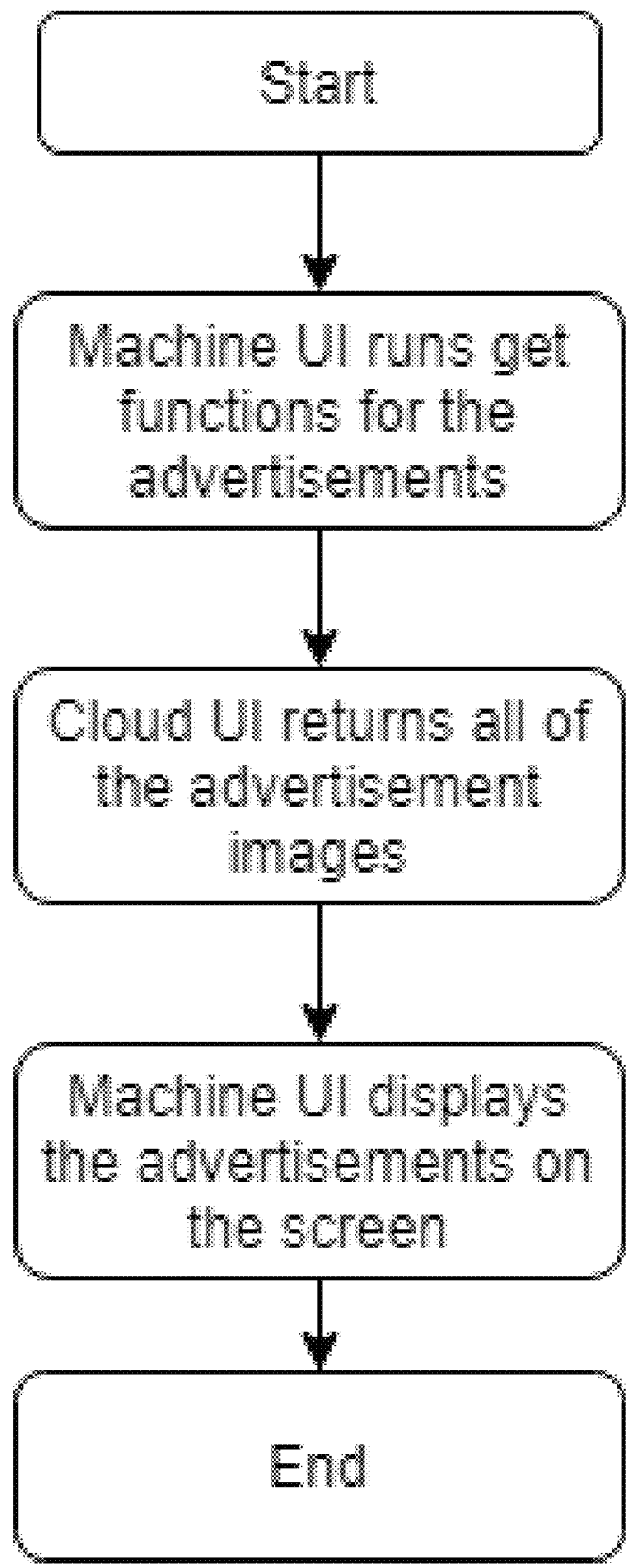
FIG. 11 illustrates an exemplary flowchart of a component of a computing system.

FIG. 11 illustrates an exemplary flowchart of a component of a computing system. FIG. 11 illustrates a locker advertisement flow diagram. A locker on boot may call the advertising pictures interface to return advertising pictures from the Cloud Service. The locker may then display the advertising pictures on a screen on or near the locker.

Figure 12A:
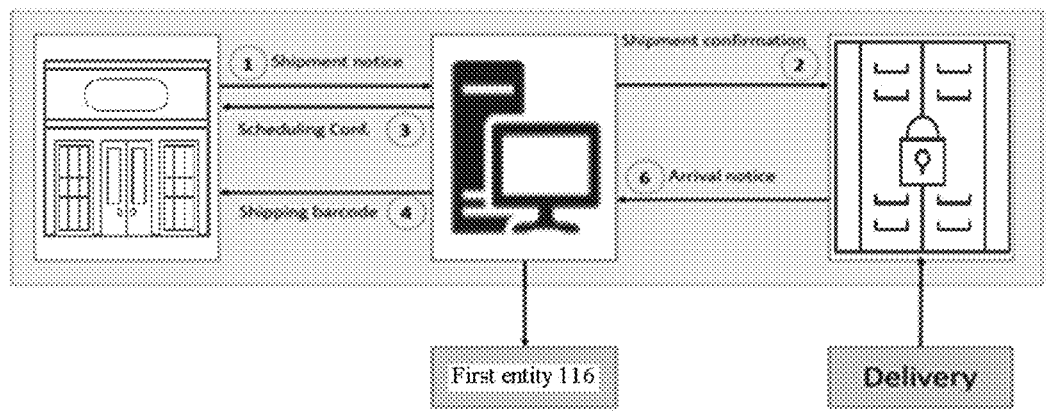
FIGS. 12A-12G illustrate exemplary flowcharts of a component of a computing system.

FIG. 12A illustrates an exemplary flowchart of a component of a computing system. FIG. 12A illustrates a cloud service flow diagram. The Cloud Service may connect with a supplier's (e.g., the third entity 120) web services through the use of APIs. When customers (e.g., the first entity 116) order or request products from the third entity 120, the customers must enter their names and a locker address (e.g., of the storage compartments 114) with the customer's identification information. The customers, alternatively, could directly select the locker as the pickup place from a supplier's website if the Cloud service has already integrated API connections with the supplier. The Cloud Service may receive a notice through the supplier's API and may check the locker's schedule to ensure a space availability of the storage compartments 114, which may be designated smart locker or storage device, at a certain time and date. The Cloud Service may provide dynamic scheduling for all connected smart locker or storage devices. The Cloud Service may also provide locker management services and machine services to communicate with the third entity 120, the first entity 116, the second entity 118, or third-party smart lockers or storage devices.

Figure 12B:
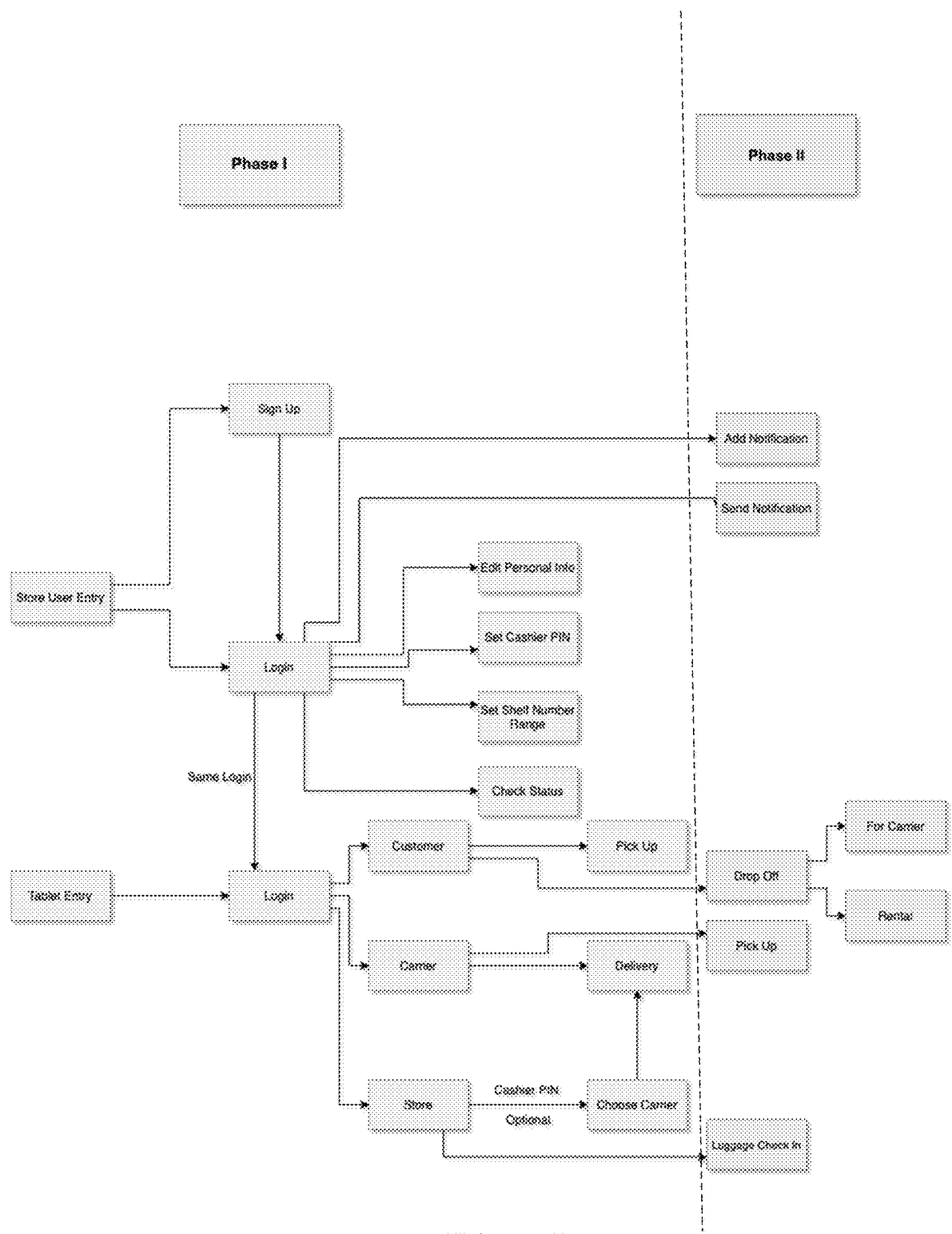

FIG. 12B illustrates an exemplary flowchart of a component of a computing system. In FIG. 12B, storage compartments 114 are present in another store location which serves as a hub station for the storage compartments 114. A representative at the store location may set a security cashier PIN that is used specifically by the representative and not by a customer such as the first entity 116. A tablet may permit login by the first entity 116, a carrier such as the third entity 120 which delivers the shipment to the storage compartments 114 or the second entity 118 which picks up the shipment and delivers the shipment directly to the first entity 116, or the representative at the store. The first entity 116 may also drop off a shipment at the storage compartments 114 so that a carrier can transport the shipment back to the third entity 116, or to rent the shipment to an other entity. Alternatively, in some embodiments, the storage compartments 114 may be present at an airport location so that a customer may temporarily store luggage in the storage compartments 114, thus avoiding the need to constantly carry around heavy luggage.

Figure 12C:
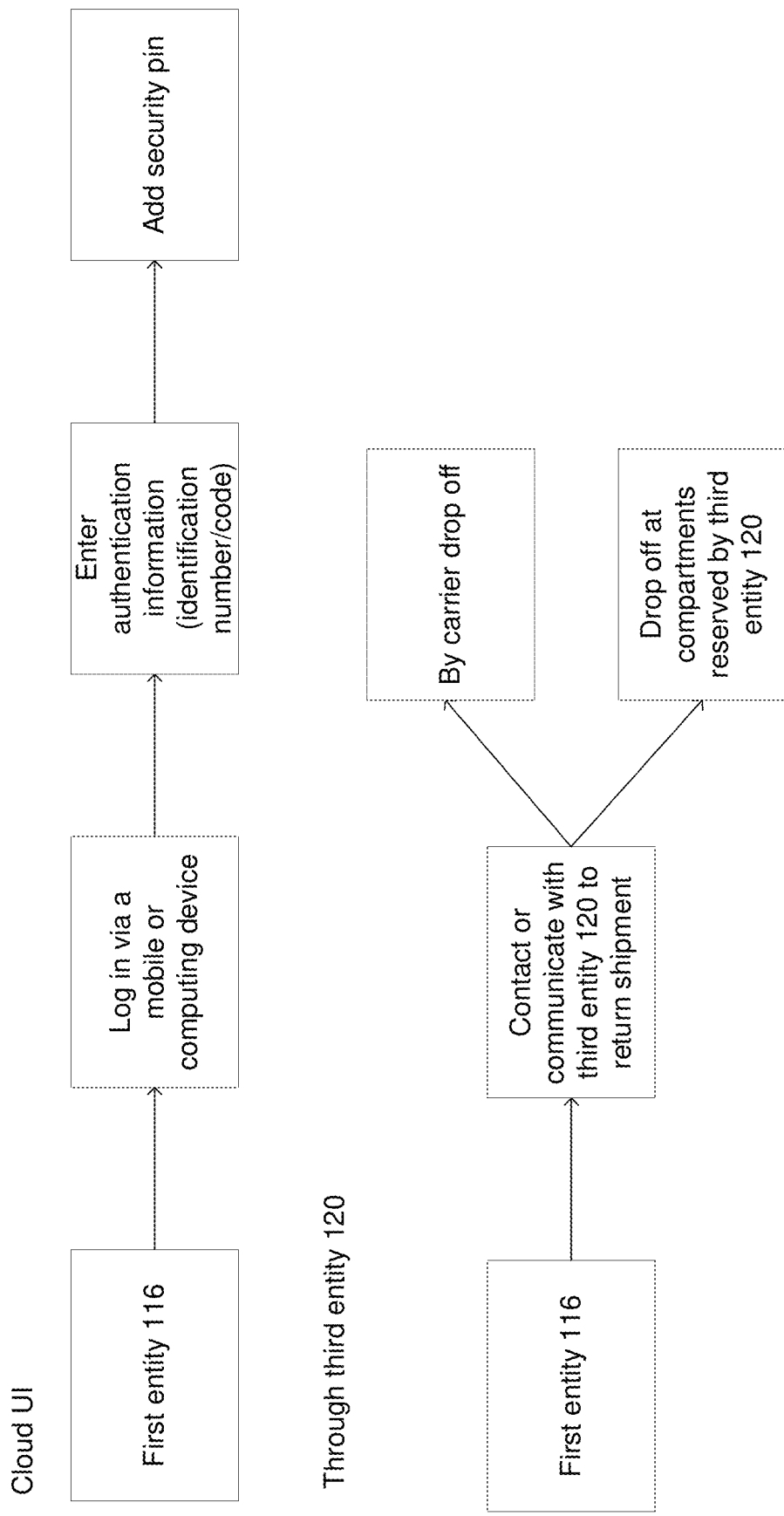

FIG. 12C illustrates an exemplary flowchart of a component of a computing system. In FIG. 12C, a customer such as the first entity 116 may add a security PIN, which the computing system 122 could recognize in addition to the identification number or identification code in case the second scannable code 117 cannot be recognized or obtained. The first entity 116 may initiate return of a shipment by dropping off the shipment at a carrier, arranging a pickup by the carrier, or leaving the shipment at a compartment of the storage compartments 114 as reserved by the third entity 120. The third entity 120 may then pick up the shipment at the storage compartments 114 or arrange a carrier to transport the shipment from the storage compartments 114.

Figure 12D:
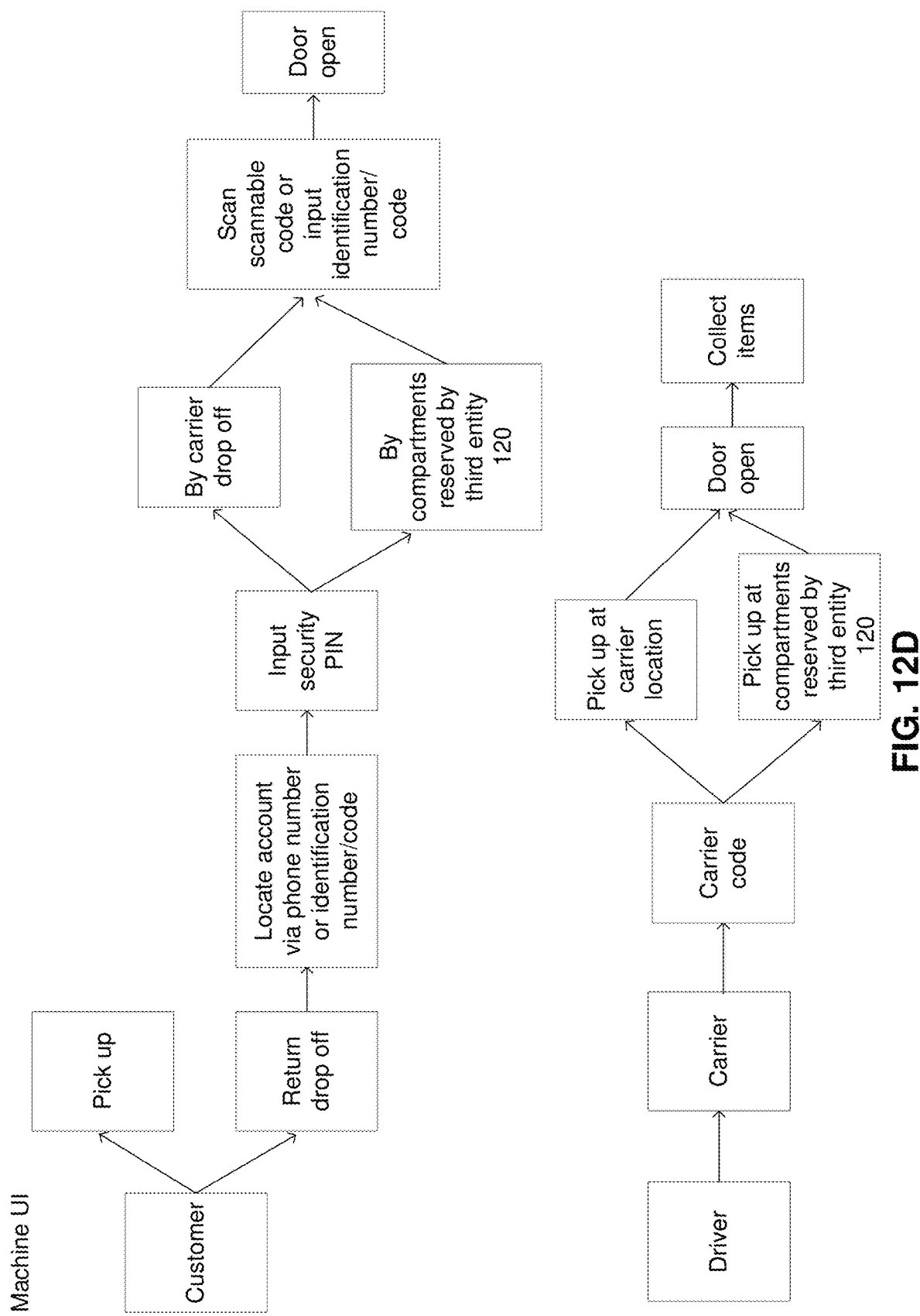

FIG. 12D illustrates an exemplary flowchart of a component of a computing system. In FIG. 12D, a customer such as the first entity 116 may drop off a shipment for return at either a carrier location or at a compartment of the storage compartments 114 as reserved by the third entity 120. In some embodiments, storage compartments 114 may be located at the carrier location. The first entity 116 may input the identification number or the identification code in addition to the security PIN, and scan the second scannable code 117 at a machine user interface of the computing system 122. The computing system 122 may recognize the inputs and the second scannable code 117 and open a door to a compartment in which the shipment is placed. Next, a carrier, for example, the second entity 118, may transport the shipment from the compartment to its final destination, back to the third entity 120. In other embodiments, the carrier may transport the shipment to the first entity 116, if a most recent previous shipment came from the third entity 120 to the storage compartments 114. The carrier may enter or scan a carrier code, such as the carrier code 119, at the machine user interface, so that the computing system will open the compartment containing the shipment.

Figure 12E:
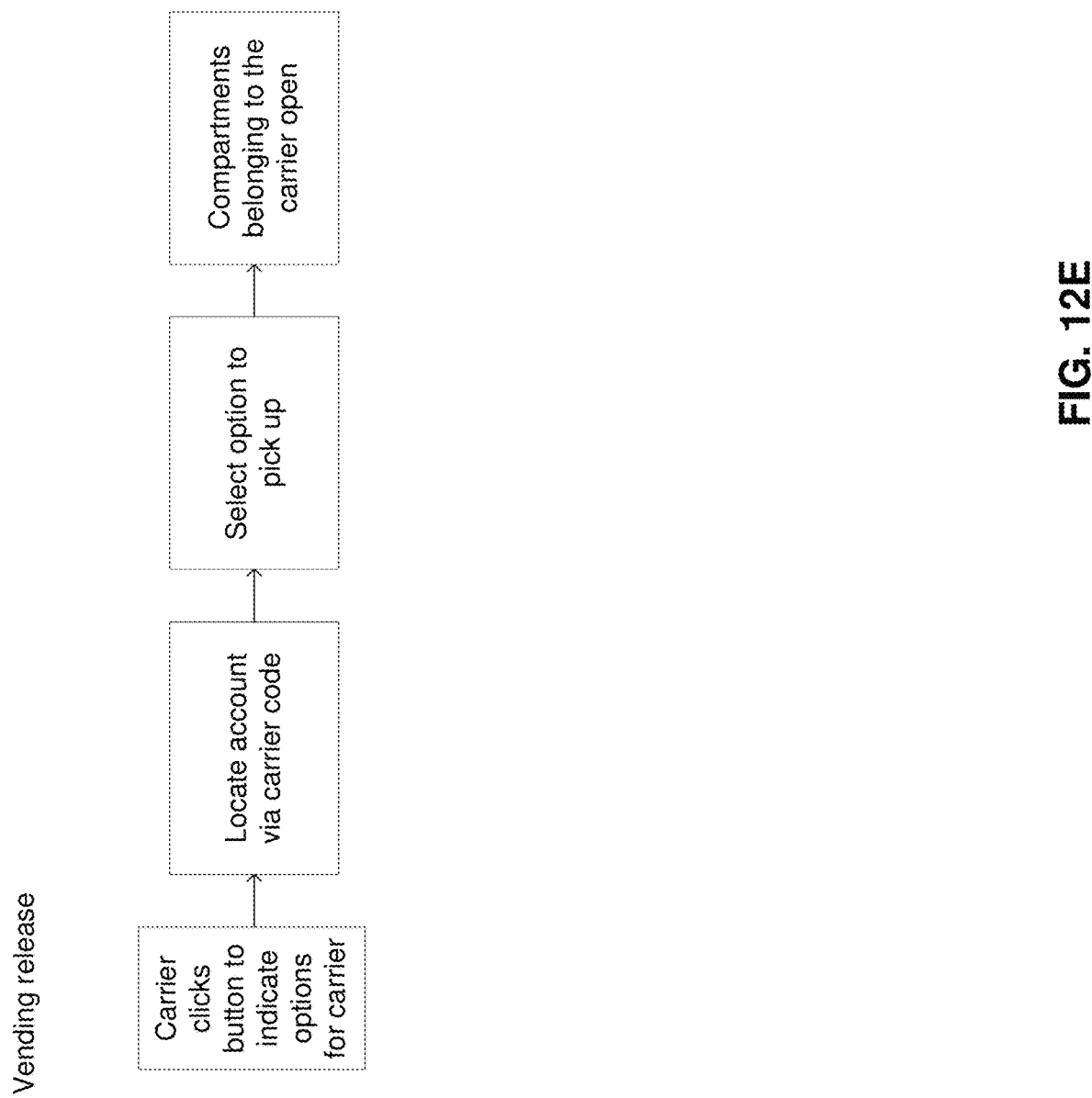

FIG. 12E illustrates an exemplary flowchart of a component of a computing system. In FIG. 12E, a mechanism of releasing a shipment to a carrier, such as the second entity 118, is shown. In FIG. 12E, once the carrier enters or scans the carrier code and selects an option to pick up a shipment, the computing system 122 may authenticate the carrier and open compartments having shipments belonging to the carrier.

Figure 12F:
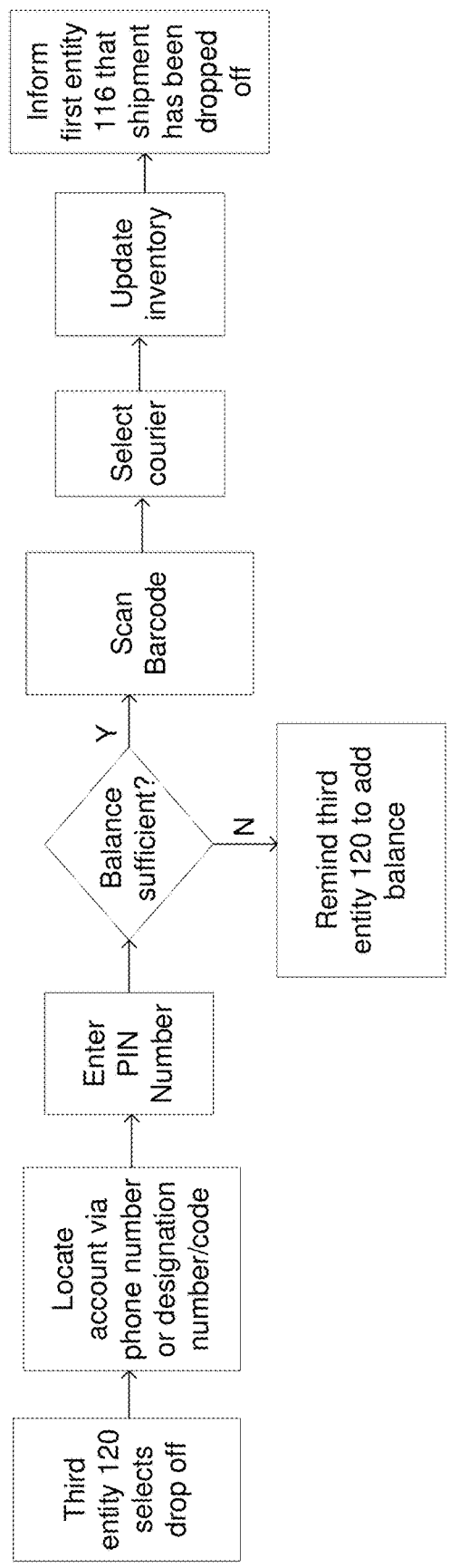

FIG. 12F illustrates an exemplary flowchart of a component of a computing system. In FIG. 12F, a mechanism of the third entity 120 commencing a shipment by using a courier is shown. The third entity 120 may be required to enter a PIN number, in addition to a phone number or the designation number or the designation code. The computing system 122 may arrange a courier to transport a shipment to the storage compartments 114 if the computing system 122 determines that an account balance of the third entity 120 is sufficient. Once the shipment successfully arrives that the storage compartments 114, the computing system 122 may update an inventory of the third entity 120 at the storage compartments 114 and communicate to the first entity 116 that the shipment has arrived at the storage compartments 114.

Figure 12G:
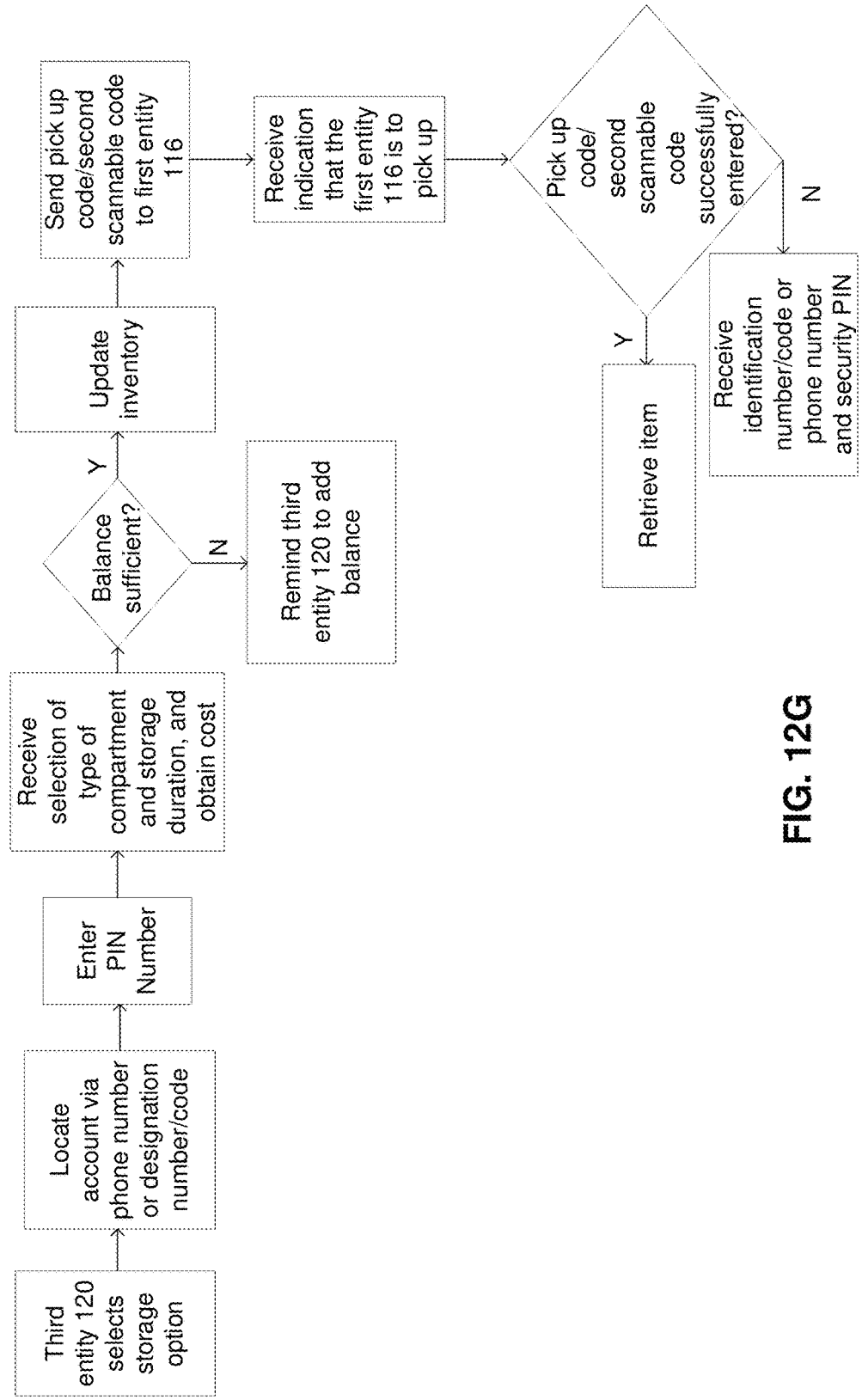
Figure 14:
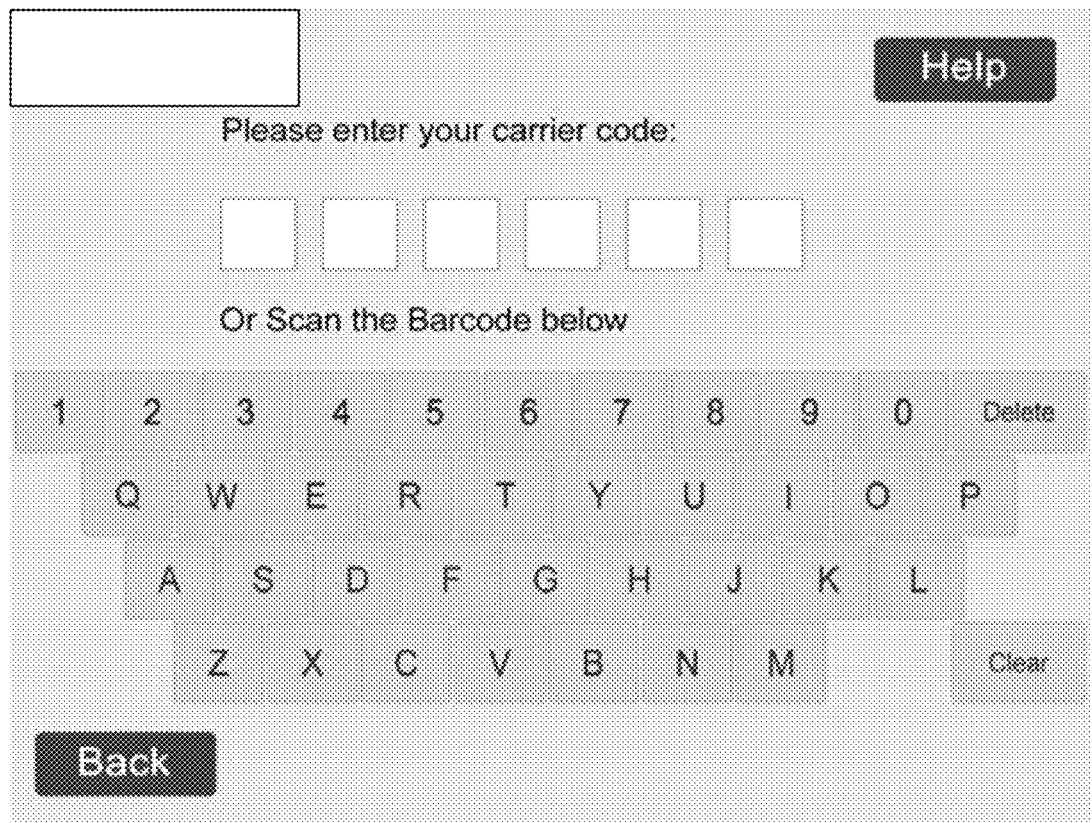
FIGS. 14-17 illustrate interfaces provided to a carrier to pick up or drop off a shipment.
Figure 15:
Figure 16:
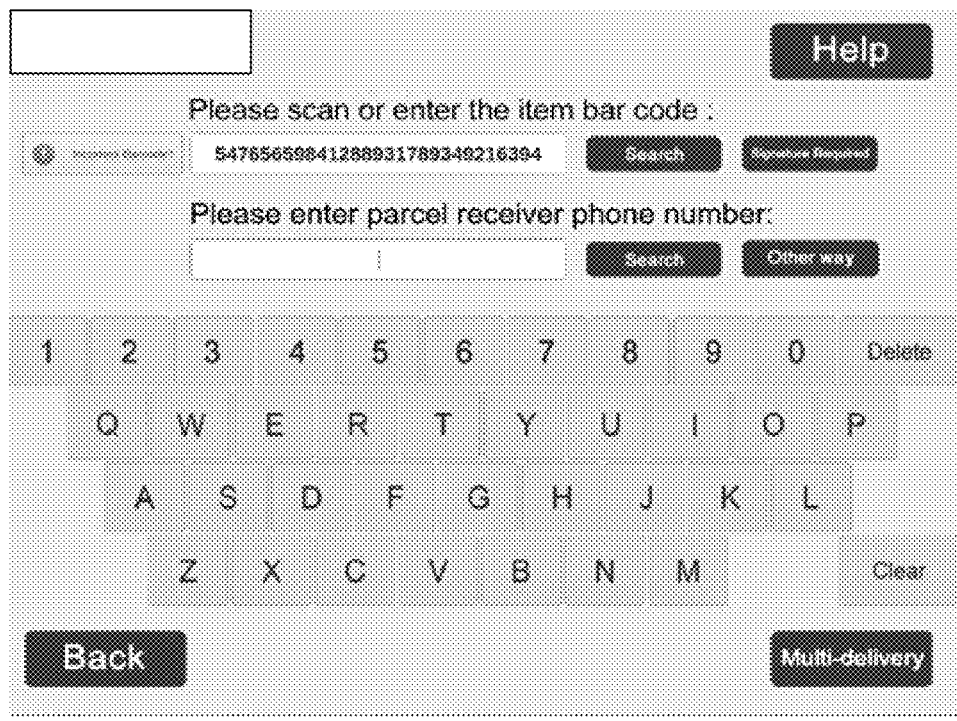
Figure 17:
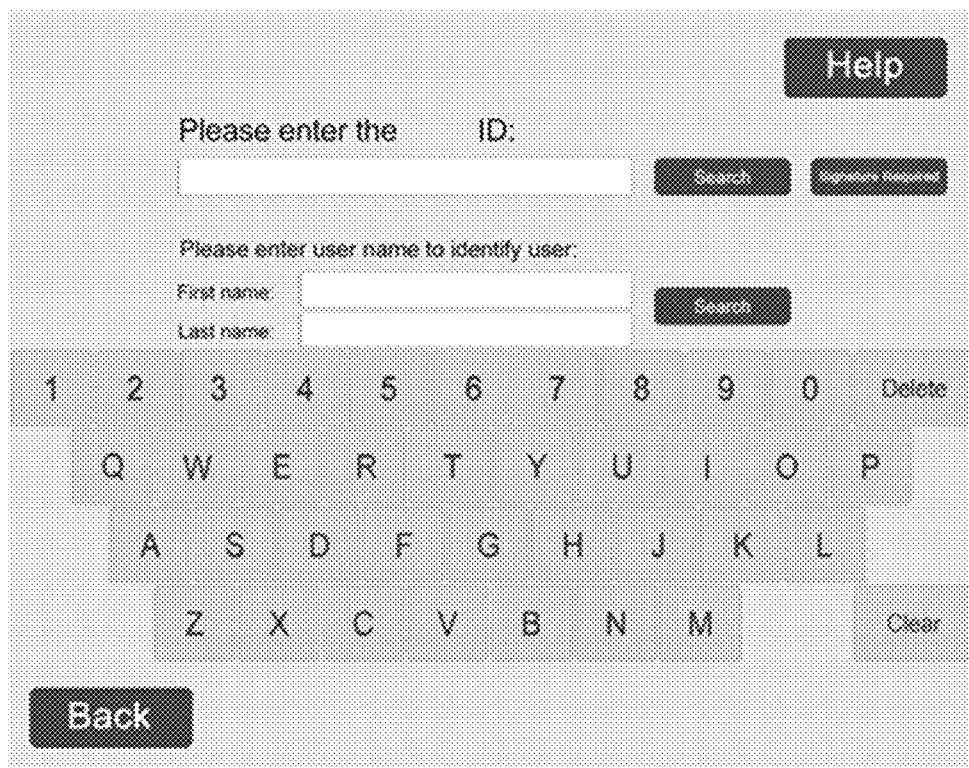

FIG. 12G illustrates an exemplary flowchart of a component of a computing system. In FIG. 12G, a mechanism of the third entity 120 commencing a shipment to the storage compartments, and of the first entity 116 picking up the shipment at the storage compartments, is shown. The third entity 120 may select a type, size, and storage duration of a compartment to store the shipment. As soon as the shipment is placed in a compartment, the computing system 122 may send a pickup code or the second scannable code 117 to the first entity 116. The computing system 122 may either recognize a scan of the second scannable code 117 or recognize an input or entry of the identification number or identification code, or phone number, in addition to the security PIN, from the first entity 116, to open a compartment storing a shipment for the first entity 116.

Figure 13:
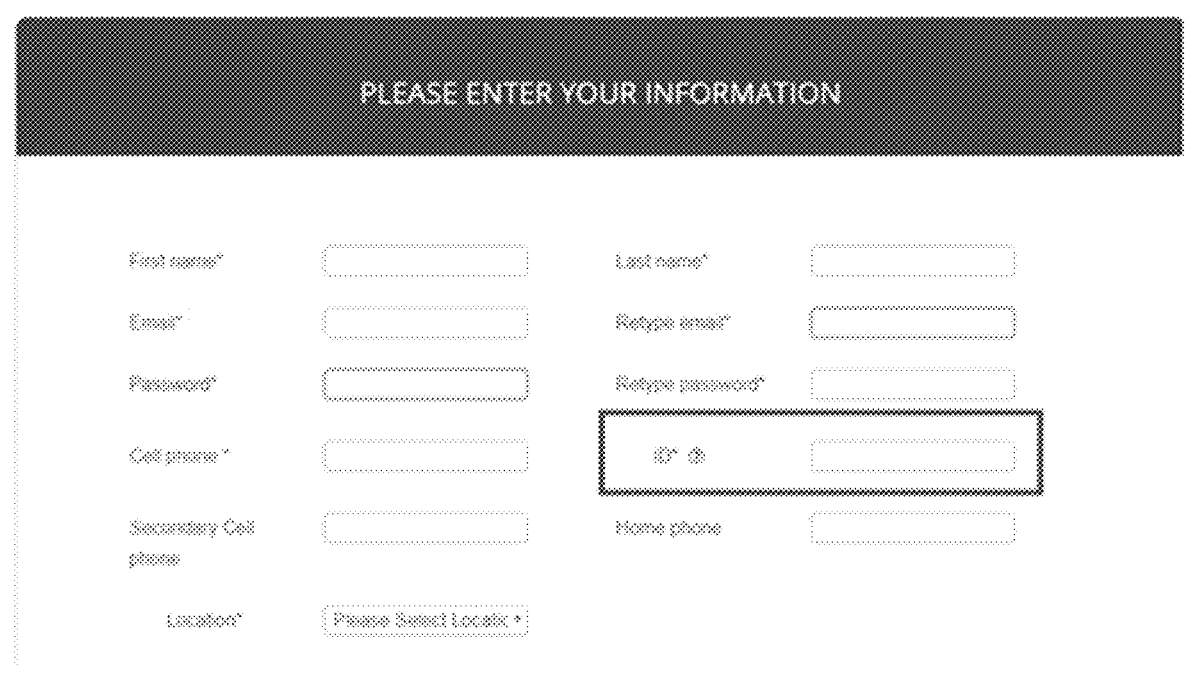

FIG. 13 illustrates an interface provided to a user (e.g., first entity 116, second entity 118, or third entity 120) to register with the Cloud Service.

FIGS. 14-17 illustrate interfaces provided to a carrier to pick up or drop off a shipment. The carrier may scan or enter a carrier code (e.g., the carrier code 119). If the computing system 122 fails to recognize the carrier code, the carrier may enter a phone number, name and carrier identification. After verification, during drop off, the carrier may select a size of a compartment. After selecting the compartment, the compartment may be opened. If the compartment is not opened, the computing system 122 may automatically report the problem information to the server. When the compartment is opened, the shipment to be delivered may be placed into the compartment. During pick up, when the compartment is closed, the locker may communicate with the locker service to update the delivery status.

Figure 18:
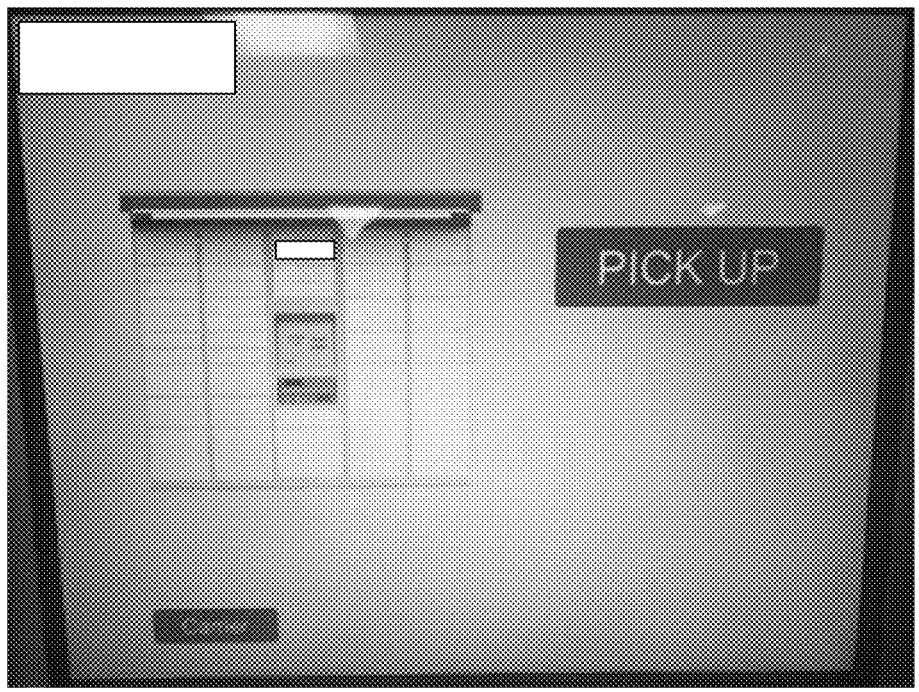
FIGS. 18, 19A, and 19B illustrate interfaces provided to a user to pick up a shipment.
Figure 19A:
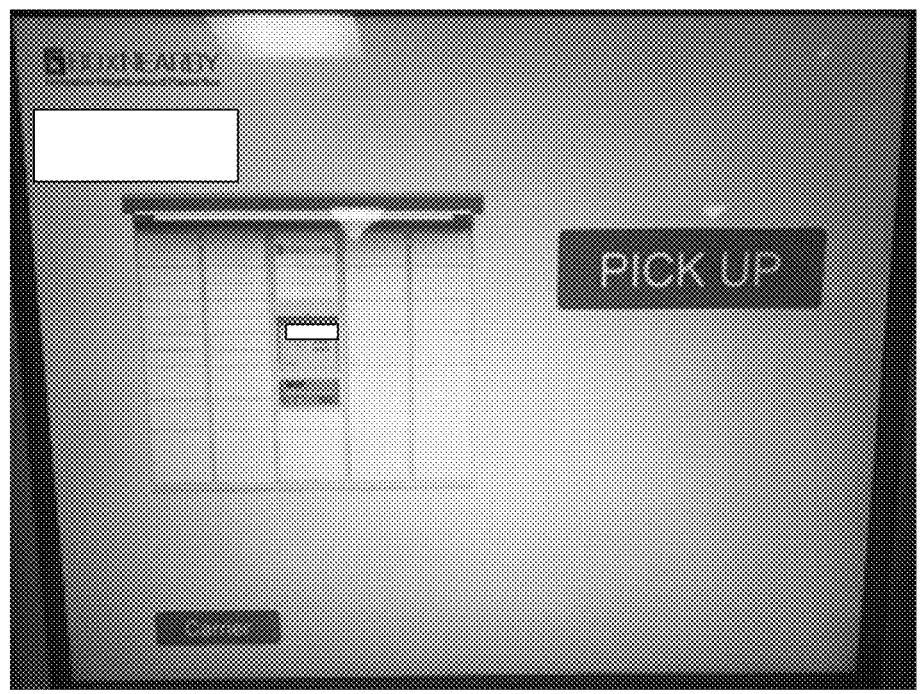
Figure 19B:
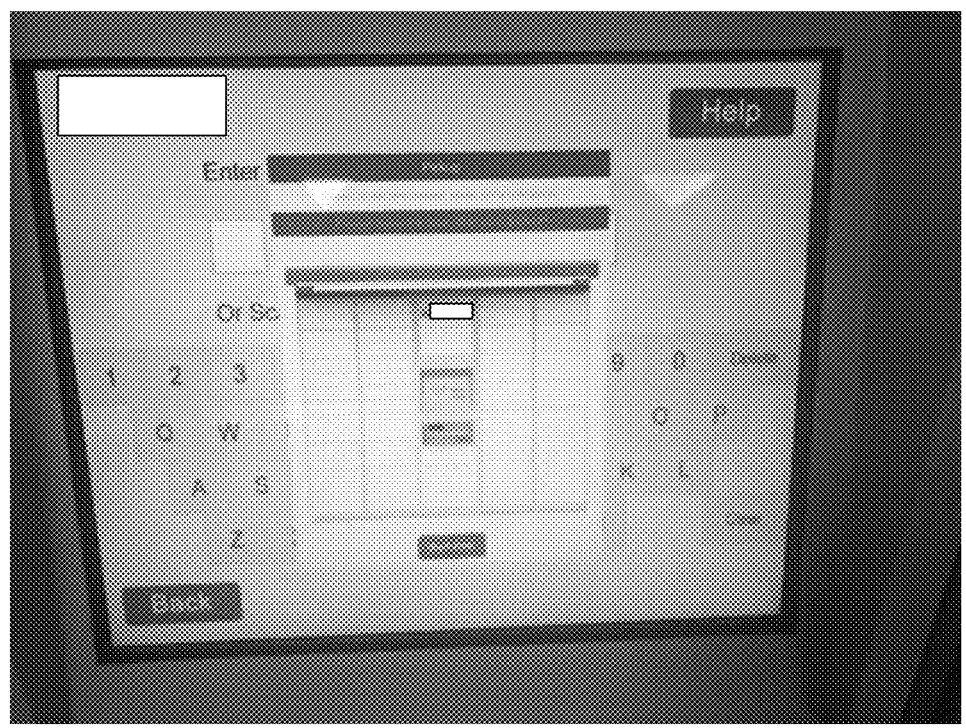

FIGS. 18, 19A, and 19B illustrate interfaces provided to a user (e.g., the first entity 116) to pick up a shipment. A user may click a "Pick Up" button and be taken to the "Pick Up" page. A user may input in the "Pick Up" code that was sent to a mobile device or computing device associated with the user or scan the second scannable code 117 so that the computing system 122 opens a compartment containing the shipment to be picked up.

Figure 20:
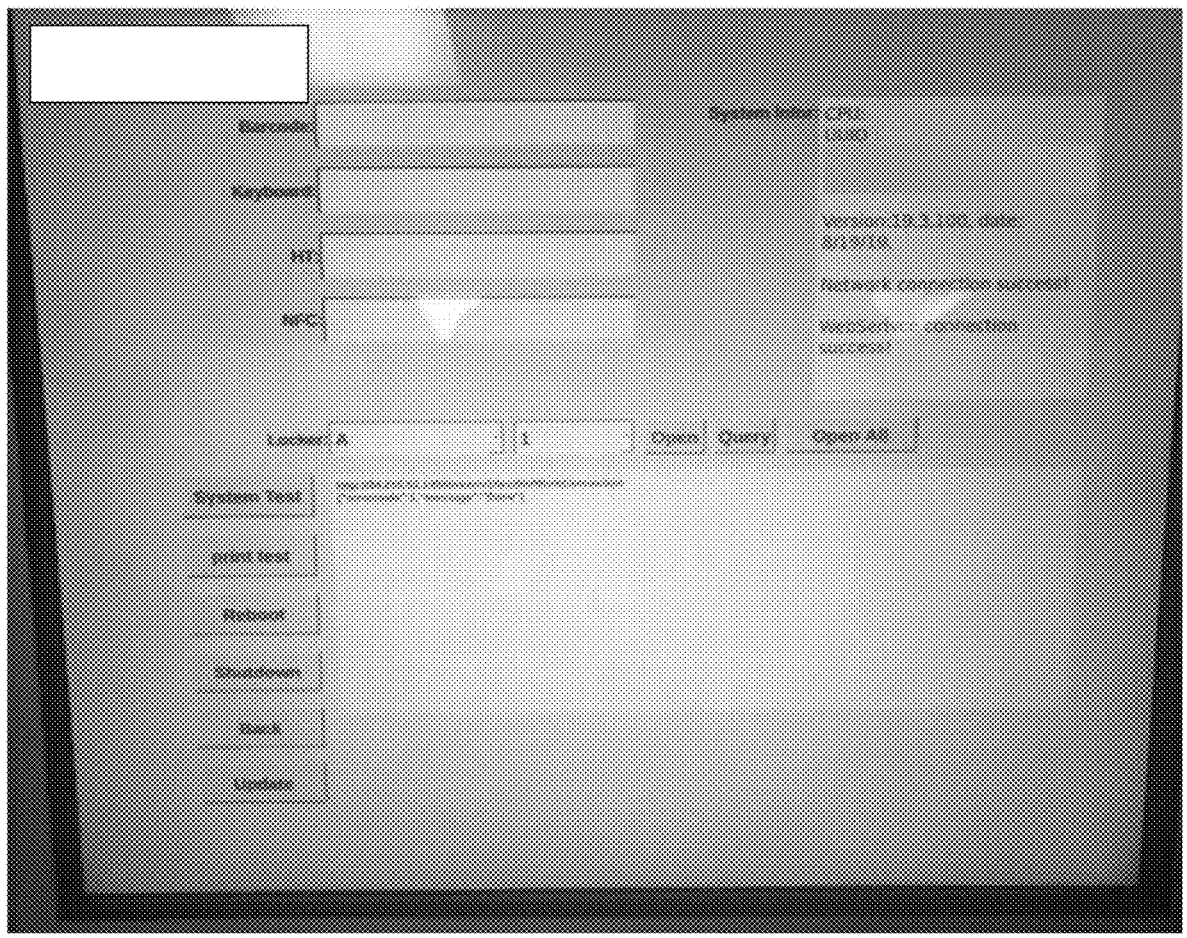
FIG. 20 illustrates an administrative user interface.

FIG. 20 illustrates an administrative user interface. The administrative user interface may provide functions of testing features within the locker, testing a label printer, rebooting a machine, and shutting down the machine.

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hardwired and/or program logic to implement the techniques.

Figure 21:
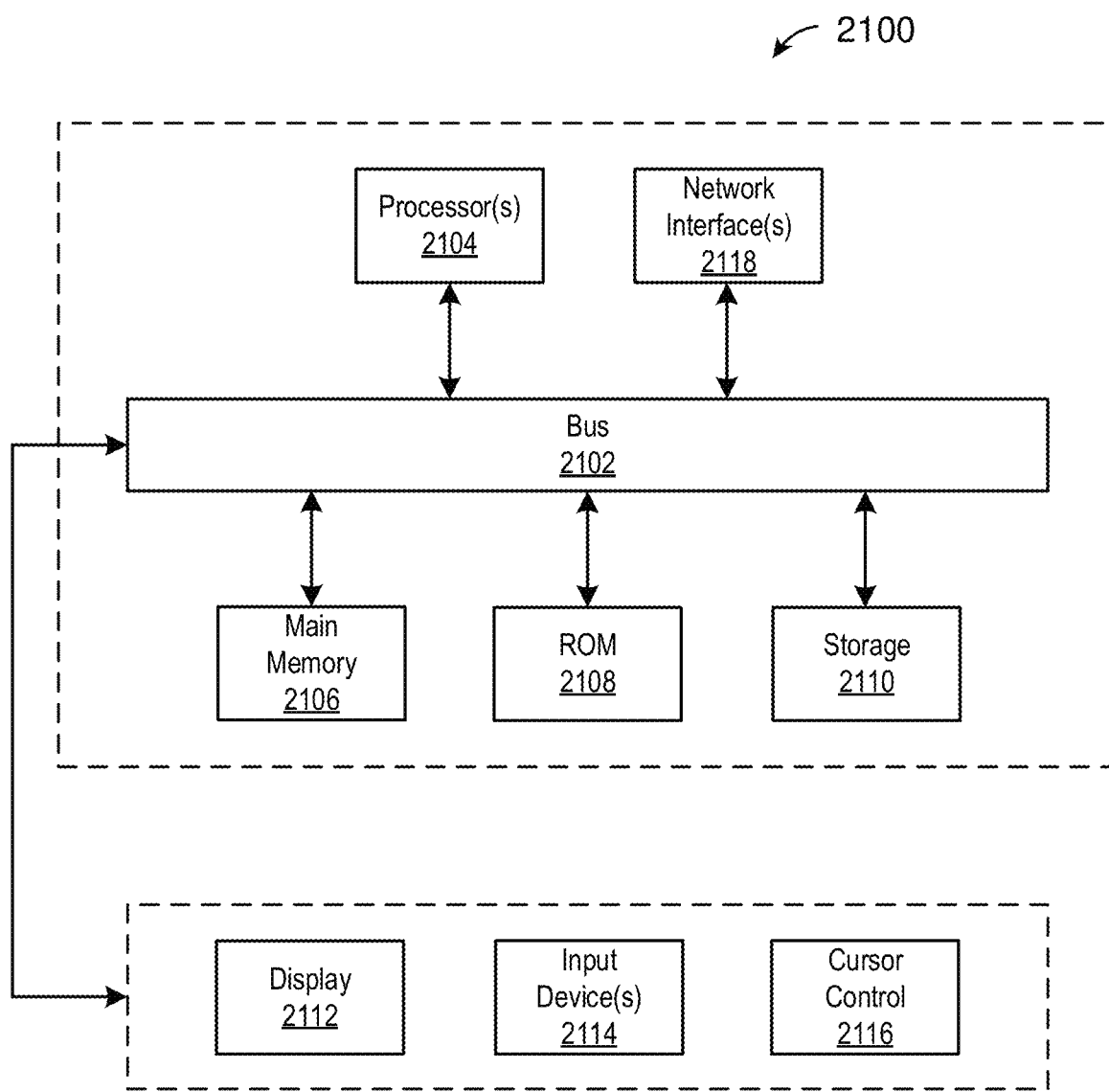
FIG. 21 illustrates a block diagram of a computer system upon which any of the embodiments described herein may be implemented.

FIG. 21 illustrates a block diagram of a computer system 2100 upon which any of the embodiments described herein may be implemented. The computer system 2100 includes a bus 2102 or other communication mechanism for communicating information, one or more hardware processors 2104 coupled with bus 2102 for processing information. A description that a device performs a task is intended to mean that one or more of the hardware processor(s) 2104 performs.

The computer system 2100 also includes a main memory 2106, such as a random access memory (RAM), cache and/or other dynamic storage devices, coupled to bus 2102 for storing information and instructions to be executed by processor 2104. Main memory 2106 also may be used for storing temporary variables or other intermediate information during execution of instructions to be executed by processor 2104. Such instructions, when stored in storage media accessible to processor 2104, render computer system 2100 into a special-purpose machine that is customized to perform the operations specified in the instructions.

The computer system 2100 further includes a read only memory (ROM) 2108 or other static storage device coupled to bus 2102 for storing static information and instructions for processor 2104. A storage device 2110, such as a magnetic disk, optical disk, or USB thumb drive (Flash drive), etc., is provided and coupled to bus 2102 for storing information and instructions.

The computer system 2100 may be coupled via bus 2102 to output device(s) 2112, such as a cathode ray tube (CRT) or LCD display (or touch screen), for displaying information to a computer user. Input device(s) 2114, including alphanumeric and other keys, are coupled to bus 2102 for communicating information and command selections to processor 2104. Another type of user input device is cursor control 2116. The computer system 2100 also includes a communication interface 2118 coupled to bus 2102.

It will be appreciated that an "engine," "processor," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiment.

A component being implemented as another component may be construed as the component being operated in a same or similar manner as the another component, and/or comprising same or similar features, characteristics, and parameters as the another component.

The invention claimed is:

1. A system comprising:
   storage compartments, each of the storage compartments being configured to store shipments and having a locking mechanism;
   a computing system configured to control operations of the storage compartments, the computing system comprising:
   one or more computing devices;
   one or more processors; and
   a memory storing instructions that, when executed by the one or more processors, cause the computing system to perform:
   receiving a request from a providing entity to reserve a portion of the storage compartments;
   obtaining identification information of a requesting entity requesting a shipment from the providing entity;
   setting an identification code of the requesting entity;
   obtaining an input by the requesting entity of a pickup location or automatically selecting a pickup location based on a location of the requesting entity, the pickup location corresponding to a location of the storage compartments;
   obtaining, from the providing entity, an input of a portion of the identification information of the requesting entity;
   generating a scannable code for the providing entity;
   transmitting the scannable code and the identification code of the requesting entity to the providing entity;
   determining a compartment of the storage compartments to be reserved in order to temporarily store the shipment;
   reserving the determined compartment;
   in response to reserving the determined component, determining whether the shipment fits inside a smaller compartment at a same or adjacent location as the reserved determined compartment; and
   in response to determining that the shipment fits inside a smaller compartment:
      reserving the smaller compartment;
      cancelling the reservation of the reserved determined compartment;
      detecting a scan of the scannable code or an input of the identification code on a computing device at a terminal of a location of or adjacent to the smaller determined compartment; and
      in response to detecting the scan or the input of the identification code, actuating, by the computing system, a physical opening of the smaller determined compartment.

* * * * *